(12) United States Patent
Landorf et al.

(10) Patent No.: US 9,157,003 B2
(45) Date of Patent: Oct. 13, 2015

(54) HIGHLY SOLUBLE CARBON NANOTUBES WITH ENHANCED CONDUCTIVITY

(75) Inventors: Christopher Landorf, Springfield, MO (US); Carissa Jones, Springfield, MO (US); Marriana Nelson, Springfield, MO (US)

(73) Assignee: Brewer Science Inc., Rolla, MO (US)

( * ) Notice: Subject to any disclaimer, the term of this patent is extended or adjusted under 35 U.S.C. 154(b) by 0 days.

(21) Appl. No.: 13/530,471

(22) Filed: Jun. 22, 2012

(65) Prior Publication Data

US 2012/0326093 A1 Dec. 27, 2012

Related U.S. Application Data

(60) Provisional application No. 61/500,985, filed on Jun. 24, 2011.

(51) Int. Cl.
*H01B 1/04* (2006.01)
*H01B 1/20* (2006.01)
*B82Y 40/00* (2011.01)
*C09D 11/52* (2014.01)
*B82Y 30/00* (2011.01)
(Continued)

(52) U.S. Cl.
CPC ............... *C09D 11/52* (2013.01); *B82Y 30/00* (2013.01); *B82Y 40/00* (2013.01); *C01B 31/0273* (2013.01); *H01B 1/24* (2013.01)

(58) Field of Classification Search
CPC ............ H01B 1/12; H01B 1/04; H01B 1/20; B82Y 30/00; B82Y 40/00
USPC .................. 252/500–511; 977/742, 842, 932
See application file for complete search history.

(56) References Cited

U.S. PATENT DOCUMENTS

| 7,244,407 | B2 | 7/2007 | Chen et al. | |
|---|---|---|---|---|
| 2006/0052509 | A1* | 3/2006 | Saitoh | 524/496 |
| 2007/0221913 | A1* | 9/2007 | Lee et al. | 257/40 |

(Continued)

FOREIGN PATENT DOCUMENTS

| JP | WO2009102023 A1 * | 8/2009 | ........... H01B 1/24 |
|---|---|---|---|
| WO | 2012/083309 A1 | 6/2012 | |

OTHER PUBLICATIONS

Gotovac et al. ("Effect of Nanoscale Curvature of Single-Walled Carbon Nanotubes on Adsorption of Polycyclic Aromatic Hydrocarbons." Nano Letters, 7(3), pp. 583-587, online Feb. 23, 2007).*

(Continued)

*Primary Examiner* — Tri V Nguyen
(74) *Attorney, Agent, or Firm* — Hovey Williams LLP

(57) ABSTRACT

New methods for preparing carbon nanotube films having enhanced properties are provided. The method broadly provides reacting carbon nanotubes (CNTs) and compounds comprising a polyaromatic moieties in the presence a strong acid. During the reaction process, the polyaromatic moieties noncovalently bond with the carbon nanotubes. Additionally, the functionalizing moieties are further functionalized by the strong acid. This dual functionalization allows the CNTs to be dispersed at concentrations greater than 0.5 g/L in solution without damaging their desirable electronic and physical properties. The resulting solutions are stable on the shelf for months without observable bundling, and can be incorporated into solutions for printing conductive traces by a variety of means, including inkjet, screen, flexographic, gravure printing, or spin and spray coating.

17 Claims, 19 Drawing Sheets

(51) Int. Cl.
*H01B 1/24* (2006.01)
*C01B 31/02* (2006.01)

(56) References Cited

U.S. PATENT DOCUMENTS

| | | |
|---|---|---|
| 2007/0280876 A1 | 12/2007 | Tour et al. |
| 2008/0076837 A1* | 3/2008 | Kuper et al. ............ 516/32 |
| 2009/0169819 A1* | 7/2009 | Drzaic et al. ............ 428/156 |
| 2010/0065788 A1* | 3/2010 | Momose et al. ............ 252/511 |
| 2010/0068621 A1* | 3/2010 | Exnar et al. ............ 429/212 |
| 2010/0137528 A1 | 6/2010 | Sample et al. |
| 2010/0187485 A1 | 7/2010 | Kitano |
| 2011/0129762 A1* | 6/2011 | Lee et al. ............ 429/524 |
| 2011/0186785 A1* | 8/2011 | Kato et al. ............ 252/510 |
| 2013/0187084 A1* | 7/2013 | Yoon et al. ............ 252/182.12 |

OTHER PUBLICATIONS

Tomonari et al. ("Solubilization of Single-Walled Carbon Nanotubes by using Polycyclic Aromatic Ammonium Amphiphiles in water—Strategy for the Design of High-Performance Solubilizers." Chem Eur J, 12, pp. 4027-4034, 2006).*

Paloniemi et al. ("Water-Soluble Full-Length Single-Wall Carbon Nanotube Polyelectrolytes: Preparation and Characterization." JPC B, 109, pp. 8634-8642, web Apr. 5, 2005).*

Tasis et al., "Chemistry of Carbon Nanotubes," Chem. Rev., 2006, 106, 1105-1136.

Meuer et al., "Pyrene Containing Polymers for the Non-Covalent Functionalization of Carbon Nanotubes," Macromol. Chem. Phys., 2009, 210, 1528-1535.

Guldi et al., "Functional Single-Wall Carbon Nanotube Nanohybrids—Associating SWNTs with Water-Soluble Enzyme Model Systems," J. Am. Chem. Soc., 2005, 127, 9830-9838.

Nakashima et al., "Water-Soluble Single-Walled Carbon Nanotubes via Noncovalent Sidewall-Functionalization with a Pyrene-Carrying Ammonium Ion," Chemistry Letters, 2002, 638-639.

Davis et al., "Phase Behavior and Rheology of SWNTs in Superacids," Macromolecules, 2004, 37, 154-160.

Ramesh, "Dissolution of Pristine Single Walled Carbon Nanotubes in Superacids by Direct Protonation," J. Phys. Chem. B, 2004, 108, 8794-8798.

Tchoul et al., "Effect of Mild Nitric Acid Oxidation on Dispersability, Size, and Structure of Single-Walled Carbon Nanotubes," Chem. Mater., 2007, 19, 5765-5772.

Lee et al., "Immobilization of Lipase on Single Walled Carbon Nanotubes in Ionic Liquid," Bull. Korean Chem. Soc., 2010, vol. 31, No. 3, 650-652.

Backes et al., "High Population of Individualized SWCNTs through the Adsorption of Water-Soluble Perylenes," J. Am. Chem. Soc., 2009, 131, 2172-2184.

Simmons et al., "Noncovalent Functionalization as an Alternative to Oxidative Acid Treatment of Single Wall Carbon Nanotubes with Applications for Polymer Composites," ACS Nano, 2009, 3(4), 865-870.

Tomonari et al., "Solubilization of Single-Walled Carbon Nanotubes by using Polycyclic Aromatic Ammonium Amphiphiles in Water—Strategy for the Design of High-Performance Solubilizers," Chem. Eur. J., 2006, 12, 4027-4034.

International Search Report and Written Opinion dated Nov. 30, 2012, in corresponding PCT/US2012/043706 filed Jun. 22, 2012.

Zhang et al., "Functionalized carbon nanotubes as sensitive materials for electrochemical detection of ultra-trace 2,4,6-trinitrotoluene," Phys. Chem. Chem. Phys., 2006, 8, 3567-3572.

Nakashima, N., "Solubilization of single-walled carbon nanotubes with condensed aromatic compounds," Science and Technology of Advanced Materials, 2006, vol. 7, No. 7, pp. 609-616.

* cited by examiner

HIGHLY SOLUBLE CARBON NANOTUBES WITH ENHANCED CONDUCTIVITY

RELATED APPLICATIONS

The present application claims the priority benefit of U.S. Provisional Patent Application No. 61/500,985, filed Jun. 24, 2011, entitled THE USE OF STRONG NON-OXIDATIVE ACIDS AND PYRENE DERIVATIVES TO PRODUCE HIGHLY SOLUBLE CARBON NANOTUBES WITH ENHANCED CONDUCTIVITY, incorporated by reference in its entirety herein.

FEDERALLY SPONSORED RESEARCH/DEVELOPMENT PROGRAM

This invention was made with government support under contract number 70NANB10H001 awarded by The National Institute of Standards and Technology's Technology Innovation Program. The United States Government has certain rights in the invention.

BACKGROUND OF THE INVENTION

1. Field of the Invention

The present invention is concerned with noncovalently functionalizing carbon nanotubes using strong acids and functionalized polyaromatic molecules in order to increase their solubilities and/or conductivities.

2. Description of the Prior Art

Carbon nanotubes (CNTs) have shown great promise for conductive trace applications, especially in printed electronics. Printed CNT traces offer a number of benefits over traditional metal traces, including ease of application and of mechanical flexibility. However, "raw" CNTs are usually produced in a very disordered and impure powder, and must be purified and dispersed to create the conductive (or semiconductive) "inks" used to print the CNT traces. Getting CNTs to remain dispersed in solution, however, can be a challenge. CNTs very strongly attract each other due to van der Waals forces, causing them to agglomerate and fall out of solution. In order to create useful CNT inks for printing, processes must be developed to ensure that the CNTs remain dispersed.

Several methods have been used to make carbon nanotubes (CNTs) more dispersible, including oxidation processes, the use of surfactants, covalent functionalization with solubilizing groups, and non-covalent functionalization. Of these methods, non-covalent functionalization has the least effect on the electronic properties of the carbon nanotubes. Covalent functionalization creates defects in the pi network of the CNTs, which adversely affects their conductivity. Similarly, oxidation of the nanotubes will negatively affect the electronic characteristics of the CNTs, as the oxidation damages the tubes and could decrease their size. The addition of additives to the solution, such as surfactants, can also disrupt the electronic properties of the final ink-printed CNT films. To reduce this effect, post-applications treatments, including repeated washings, of the printed CNT films are necessary, which creates extra steps, yield lost, and large amounts of waste, and still may not restore the conductivity of the original CNTs.

Several methods of non-covalently functionalizing carbon nanotubes have been published. If the functional group is a liquid, then simply stirring at a raised temperature can be effective. Some solids can be melted with the carbon nanotubes but many solids decompose before melting, which is particularly the case for many polyaromatic hydrocarbons. Sonication can also be used to temporarily disperse CNTs in a solvent. Sonication can be used in conjunction with another functionalizing method, since it temporarily breaks up the carbon nanotube bundles and allows the functionalizing groups to get between the CNTs. However, strong or prolonged sonication has a tendency to damage carbon nanotubes, which likely results in less than desirable electronic properties.

There is a need for improved methods of solubilizing carbon nanotubes while preserving, and even enhancing, their conductivity.

SUMMARY OF THE INVENTION

The present invention overcomes the problems of the prior art by providing a method of preparing a carbon nanotube dispersion with improved carbon nanotube solubilities and conductivities. The method comprises providing a mixture of carbon nanotubes, a compound comprising at least one polyaromatic moiety, and an acid. The compound comprising at least one polyaromatic moiety is noncovalently bonded with the carbon nanotubes, and the acid is reacted with the at least one polyaromatic moiety. The invention is also directed towards the dispersion formed by this method.

In another embodiment, the invention provides a dispersion comprising carbon nanotubes noncovalently bonded to compounds comprising respective polyaromatic moieties. At least some of the polyaromatic moieties are reacted with an acid. The dispersion has a carbon nanotube concentration of at least about 0.05% by weight, based upon the total weight of the dispersion taken as 100% by weight. The dispersion is also formable into a film having a sheet resistance of less than about 7,000 Ω/sq.

DETAILED DESCRIPTION OF THE PREFERRED EMBODIMENTS

Inventive Method

Figure 1:
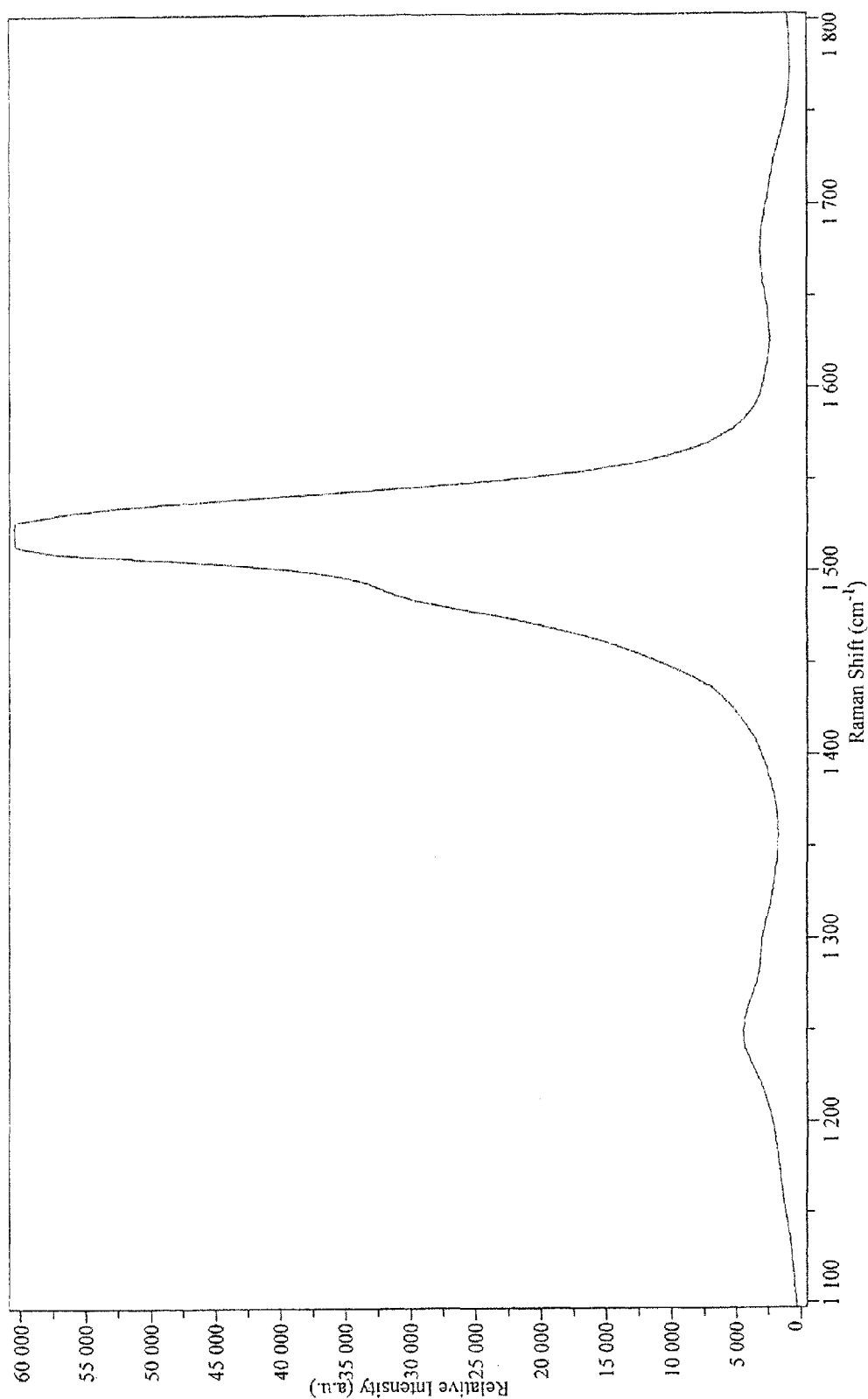
FIG. 1 is a graph depicting the D/G ratio of the sample prepared in Example 1.

The inventive method is broadly directed towards reacting CNTs, polyaromatic moieties (provided as part of a compound comprising at least one polyaromatic moiety), and an acid. The CNTs can first be added to the acid for breaking apart the CNTs that may be bundled or clustered together, followed by addition of the compound comprising at least one polyaromatic moiety. Alternatively, the compound comprising at least one polyaromatic moiety can be combined with the acid, followed by addition of the CNTs. As a further alternative, the compound comprising at least one polyaromatic moiety and CNTs could first be combined, followed by addition of the acid.

Regardless of the order of addition, the mixture should be stirred until a consistent dispersion is achieved, i.e., until the dispersion is unchanging and essentially stable. This will typically take from about 6 hours to about 4 days, more preferably from about 10 hours to about 2 days, and even more preferably from about 12 hours to about 24 hours. The temperature of the mixture during this time is preferably from about 0° C. to about 100° C., more preferably from about 15° C. to about 60° C., and even more preferably from about 20° C. to about 25° C.

During this reaction process, several things occur, typically simultaneously. The acid works to break apart any CNT clusters or bundles. The polyaromatic moieties will (reversibly) associate with the CNTs. Preferably, the polyaromatic moieties non-covalently bond with the CNTs. As used herein, the term "non-covalent bonding" is used to refer to bonding that does not involve the intimate sharing of pairs of electrons, as in covalent bonding, but rather involves more dispersed variations of electromagnetic interactions. Preferred examples of non-covalent bonding include hydrogen bonding and electrostatic, intermolecular attraction.

Additionally, the acid preferably functionalizes the compound comprising at least one polyaromatic moiety (e.g., the acid might sulfonate the compound comprising at least one polyaromatic moiety). Advantageously, this process can be accomplished without sonication. It is also preferred that the CNTs are not oxidized during this reaction and also remain unfunctionalized (or are at least not further functionalized beyond possible sulfonation that could occur at established defect sites).

After a consistent reaction mixture has been achieved, the temperature of the mixture is preferably lowered to a range of from about −5° C. to about 40° C., and even more preferably from about −5° C. to about 10° C. This can be accomplished by transferring the resulting dispersion to ice or ice cold water. At this stage, the pH of the dispersion is from about 0 to about 1, and more preferably from about 0 to about 0.5. The pH is preferably adjusted by addition of a base (e.g., concentrated ammonium hydroxide) to the highly acidic dispersion, raising the pH to a range of from about 0 to about 10, and even more preferably from about 0 to about 8. The solution is then preferably filtered and washed with deionized ("DI") water and dilute ammonium hydroxide to yield the inventive carbon nanotube solid or dispersion (depending upon whether cross flow filtration was used) that can be used to prepare inks, for example.

Ingredients for Carrying Out Inventive Method

Suitable CNTs for use in the present inventive method include any raw single-walled, double-walled, or multi-walled CNTs (SWCNTs, DWCNTs, and MWCNTs, respectively). Preferably, the CNTs are pristine, that is, CNTs having little or no sidewall defects, existing functionalization, or doping. Non-pristine CNTs may be used, but the existing functionalization or doping may be damaged by the acid treatment, and the resulting conductivity might be affected. Exemplary types of CNTs for this process include, but are not limited to, CG200 CNTs and SG65 CNTs (available from SWeNT), XBC3350 CNTs (available from CCNI), HiPco™ CNTs (available from NanoIntegris), as well as those available from Thomas Swan and CheapTubes.

Suitable compounds comprising at least one polyaromatic moiety for use in the inventive method include any unsubstituted or substituted polyaromatics that possess a physical and electronic structure allowing them to be non-covalently bonded to the surface of the CNTs. Preferably, the polyaromatic moieties are planar or have a large planar area and contain carbon ranges from about $C_{10}$ to about $C_{300}$, more preferably from about $C_{12}$ to about $C_{30}$, and even more preferably from about $C_{16}$ to about $C_{20}$. Exemplary polyaromatic compounds include substituted (at any position) and unsubstituted versions of compounds selected from the group consisting of naphthalene, anthracene, phenanthracene, pyrene, tetracene, tetraphene, chrysene, triphenylene, pentacene, pentaphene, perylene, benzo[a]pyrene, coronene, anthanthrene, corannulene, ovalene, graphene, fullerene, cycloparaphenylene, polyparaphenylene, cyclophene, and similar molecules, as well as compounds containing moieties of the foregoing. Exemplary substituted polyaromatic compounds include those selected from the group consisting of 1-pyrenebutyric acid, 1-pyrenemethylamine hydrochloride, rubrene, pyrene, and triphenylene.

Suitable acids for use in the inventive process include any strong acid (and preferably a sulfonating strong acid) or superacid. Preferably the acid has a pKa of less than about −1, preferably less than about −12, and more preferably from about −12 to about −14. Exemplary acids include, but are not limited to, sulfuric acid (oleum), chlorosulfonic acid, triflic acid, p-toluenesulfonic acid, and mixtures thereof.

The CNTs and compound comprising at least one polyaromatic moiety are preferably utilized in the inventive method at levels such that the molar ratio of CNTs to polyaromatic moieties is from about 25:75 to about 75:25, preferably from about 35:65 to about 65:35, more preferably from about 45:55 to about 55:45, and even more preferably about 50:50. The acid (or acids, if a mixture of acids is utilized) is preferably utilized at levels of from about 90% to about 99.99% by weight, more preferably from about 95% to about 99.9% by weight, and even more preferably from about 98% to about 99.8% by weight, based upon the total weight of the dispersion taken as 100% by weight.

In one embodiment, the resulting dispersion is essentially free of surfactants. That is, surfactants are utilized in the method and/or included in the final dispersion at levels of less than about 1% by weight, preferably less than about 0.5% by weight, and more preferably about 0% by weight, based upon the total weight of the CNTs taken as 100% by weight.

In another embodiment, the CNT dispersions consist essentially of, or even consist of, the CNTs, compound comprising at least one polyaromatic moiety, and acid (where at least some and maybe all of the acid is reacted with the compound comprising at least one polyaromatic moiety).

Resulting Dispersions and Uses Thereof

It will be appreciated that the above-described dual functionalization of the inventive method allows the CNTs to be dispersed at concentrations of greater than about 0.5 g/L (about 0.05% by weight), preferably greater than about 1 g/L (about 0.10%), preferably greater than about 1.5 g/L, and more preferably from about 1.5 g/L to about 3 g/L without damaging their desirable electronic properties. Furthermore, further post-processing steps are not needed beyond addition of any solvents for further dispersing the CNTs, preparing inks, etc. That is, conductive additives or dopants are not needed once the CNTs are dispersed.

Because damage to the CNTs is minimized, or even avoided, during this process, the D/G ratio of the CNTs in the resulting dispersion is within about 0.2, preferably within about 0.1, and more preferably within about 0.05 of the D/G ratio of the raw CNTs used to prepare the inventive dispersion.

The resulting solutions or dispersions are shelf-stable (i.e., no observable bundling) for at least about 2 weeks, preferably at least about 3 months, and more preferably at least about 6 months. Furthermore, because the CNT functionalization is non-covalent, it does not disrupt the $\pi$ network, but instead leaves the electronic structure intact so that films made from the resulting CNTs are highly conductive. The functionalization of the compound comprising at least one polyaromatic moiety also serves to increase the conductivity of films formed from the resulting CNT dispersion. This functionalization increases the solubility of the compound comprising at least one polyaromatic moiety and provides $\pi$-$\pi$ interactions between the functionalized polyaromatic hydrocarbons and the CNTs.

The dispersions can be used to formulate inks to print highly conductive traces for printed electronic applications. Films can be formed from the dispersions or inks using known methods (e.g., including as inkjet, screen, flexographic, gravure printing, or spin and spray coating). The resulting films have high conductivities and low sheet resistances. More particularly, the sheet resistance will be less than about 7,000 $\Omega$/sq at 85% T, preferably less than about 2,000 $\Omega$/sq at 85% T, and more preferably from about 300 $\Omega$/sq to about 600$\Omega$ at 85% T. Additionally, with the inventive method, there is no need for a wash step after the coating has been deposited. The above properties allow the inventive dispersions and films to be useful in numerous electronic devices, including interconnects, integrated circuits, microelectronics, optoelectronics, photoelectronics, microelectromechanical systems (MEMS), photovoltaics, sensors, and LEDs.

EXAMPLES

The following examples set forth preferred methods in accordance with the invention. It is to be understood, however, that these examples are provided by way of illustration and nothing therein should be taken as a limitation upon the overall scope of the invention.

Example 1

Reaction of Carbon Nanotubes With 1-Pyrenebutyric Acid

In this procedure, 203 mg of CG200 carbon nanotubes (Product No. 724777, SouthWest NanoTechnologies, Norman, Okla.) and 205 mg of 1-pyrenebutyric acid (Product No. 257354, Sigma Aldrich, St. Louis, Mo.) were placed in a 250-ml Schlenk flask and flushed with nitrogen. Then, 60 mL of fuming sulfuric acid (20% free $SO_3$, Product No. 435597, Sigma Aldrich, St. Louis, Mo.) were cannulated into the flask. The solution was stirred overnight at room temperature. An attempt to quench the solution into cold water was made, but the cannula clogged. Fuming sulfuric acid was cannulated into the flask until the solution was free flowing, and the solution was again stirred overnight at room temperature. The solution was free-flowing and uniform. This solution was cannulated dropwise into 300 mL of ice cold DI water. The pH of this solution was then adjusted to 4.5 with 350 mL of concentrated ammonium hydroxide (29% by weight, Product No. 5820, J.T. Baker, Phillipsburg, N.J.). The solution was filtered through a 10-μm polycarbonate filter (Isopore™ membrane filter, Catalog No. TCTP 04700, 47-mm diameter, Millipore, Billerica, Mass.) with constant mechanical stirring to prevent buckypaper from forming on the filter surface. Filtration was run by continuously adding 100 mL of DI water until the solution was clear.

Figure 2:
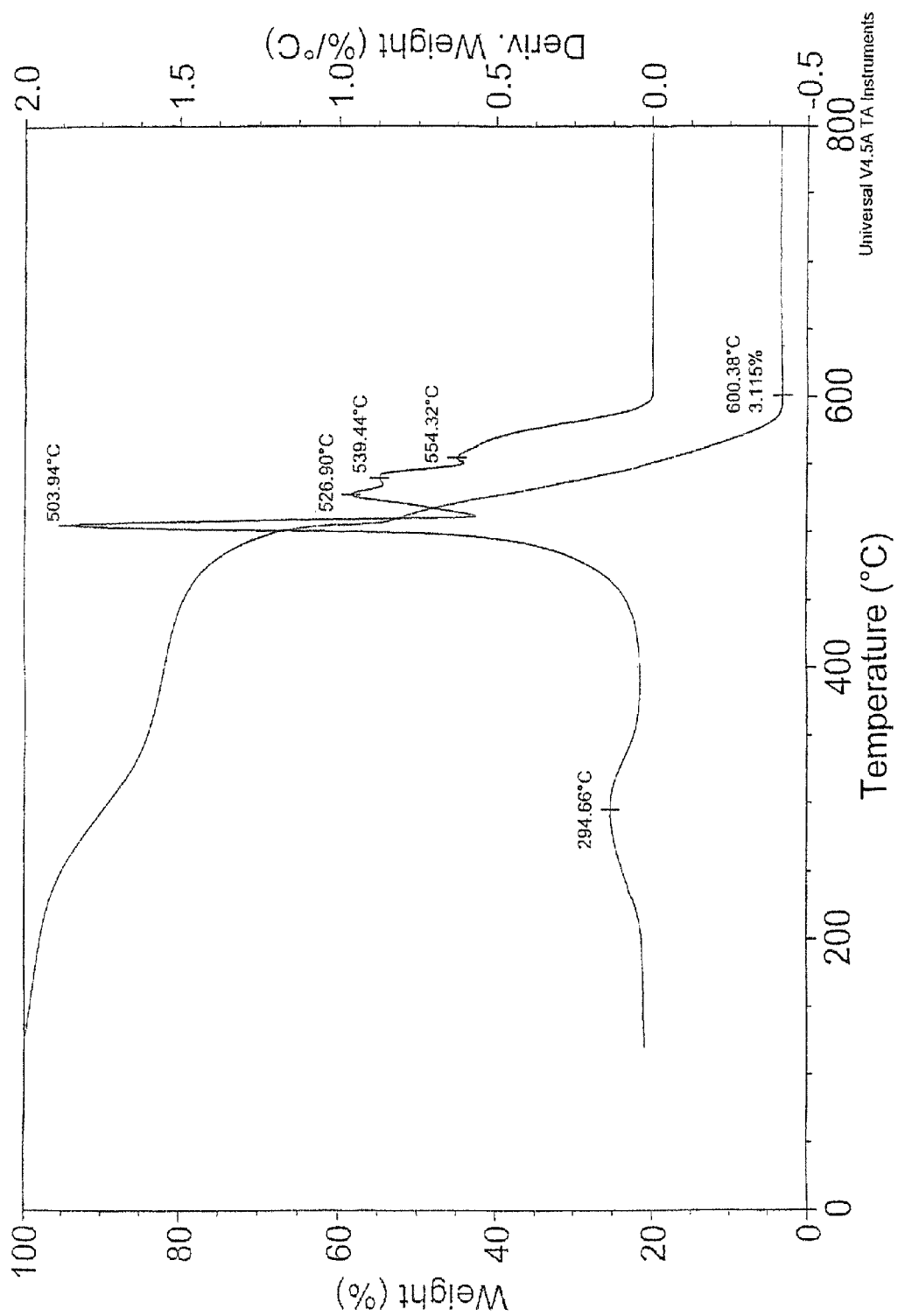
FIG. 2 is a graph showing the TGA analysis of the sample prepared in Example 1.
Figure 3:
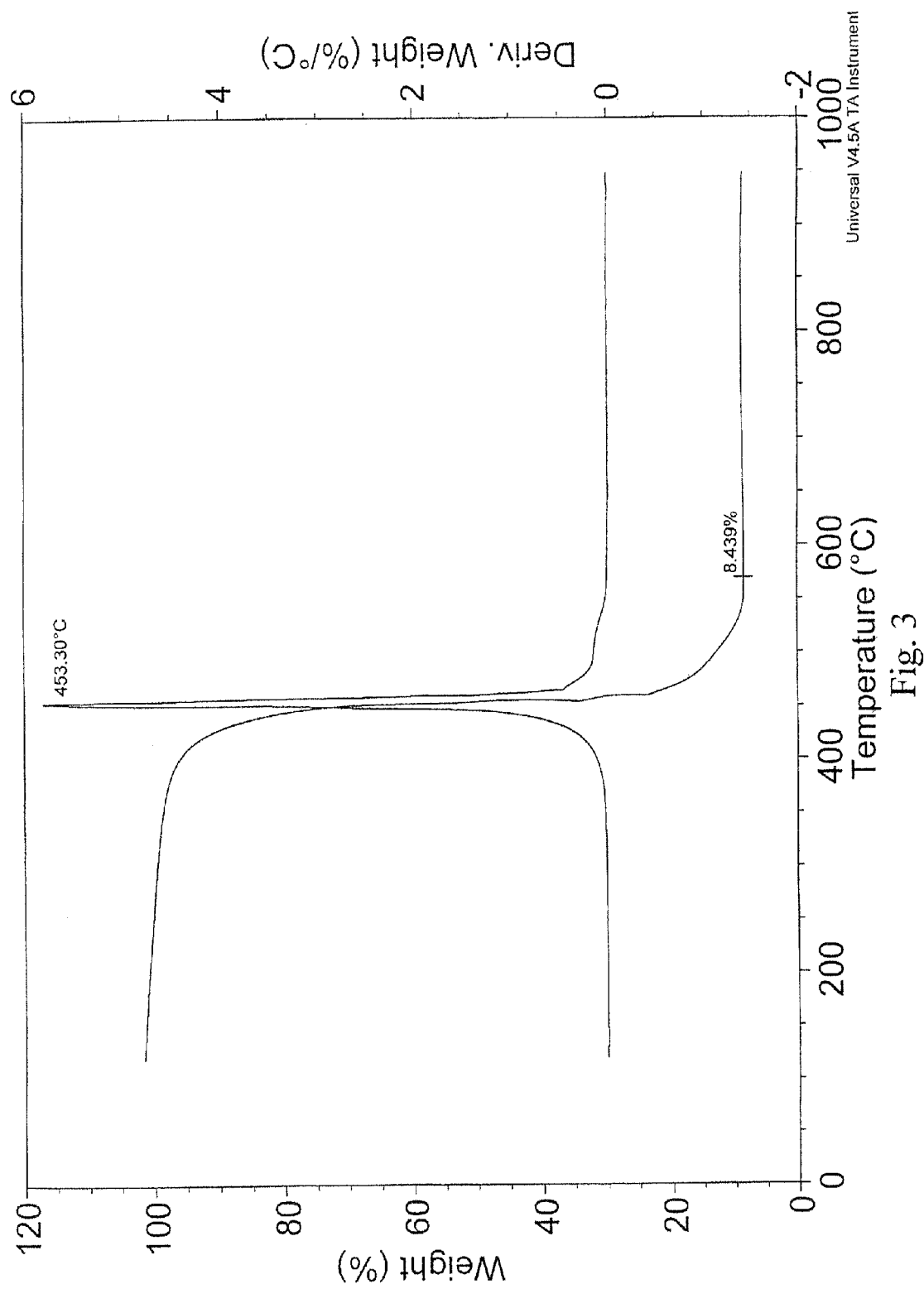
FIG. 3 is a graph of the TGA analysis of raw CG200 carbon nanotubes.

Next, 670 mg of wet tubes were sonicated overnight in 1 liter of pH 8.5 ammonium hydroxide at 3° C. The concentration (measured by a filter disk) was 0.364 g/L. The solution was centrifuged at 22.5 krpm for 30 minutes, and no significant residue fell out. The D/G ratio was measured at 0.082 (633-nm laser; see FIG. 1). The metals content was found to be 3.1% metals by thermogravimetric analysis (TGA; see FIG. 2). For comparison, the raw carbon nanotube material was 8.4% metals by TGA (FIG. 3). TGA was run on a wet sample (0.7449% solids), A decomposition peak occurred at 294.66° C. $T_{Onset}$ was 503.94° C. A number of peaks occurred at 526.90° C., 539.44° C., and 554.32° C.

The solution was spray coated onto glass, and the sheet resistance of the film was measured with respect to % transmittance (% T; Table 1). The % T decreased as the number of coats increased. The low sheet resistance of the resulting films indicated non-covalent functionalization, because covalent functionalization introduces defects, and defects decrease conductivity.

TABLE 1

| % T | SHEET RESISTANCE (Ohm/Sq) |
|---|---|
| 96.6 | $1.88 \times 10^5$ |
| 94 | $3.72 \times 10^4$ |

TABLE 1-continued

| % T | SHEET RESISTANCE (Ohm/Sq) |
|---|---|
| 92.5 | $1.39 \times 10^4$ |
| 90.1 | $5.32 \times 10^3$ |
| 87.9 | $5.37 \times 10^3$ |
| 86.5 | $2.53 \times 10^3$ |

Example 2

Reaction of Carbon Nanotubes With 1-Pyrenebutyric Acid and Graphene

In this Example, 200 mg of CG200 carbon nanotubes, 200 mg of 1-pyrenebutyric acid, and 200 mg of xGnP® graphene nanoplatelets (25-micron diameter, lot SU52909, XG Sciences, Lansing, Mich.) were placed in a 250-mL Schlenk flask and flushed with nitrogen. Then, 276 grams of fuming sulfuric acid (20% free $SO_3$) were cannulated into the flask. The solution was stirred for 2 days. The solution was free flowing and uniform. This solution was cannulated dropwise into 250 mL of ice cold DI water. Next, 300 mL of ammonium hydroxide (24% by weight, Product No. 09870, Sigma Aldrich, St. Louis, Mo.) were then added dropwise. The resulting solution was then filtered through a 10-µm polycarbonate filter with constant mechanical stirring to prevent buckypaper from forming on the filter surface. Filtration was run by continuously adding 100 mL of DI water until the solution was clear.

Figure 4:
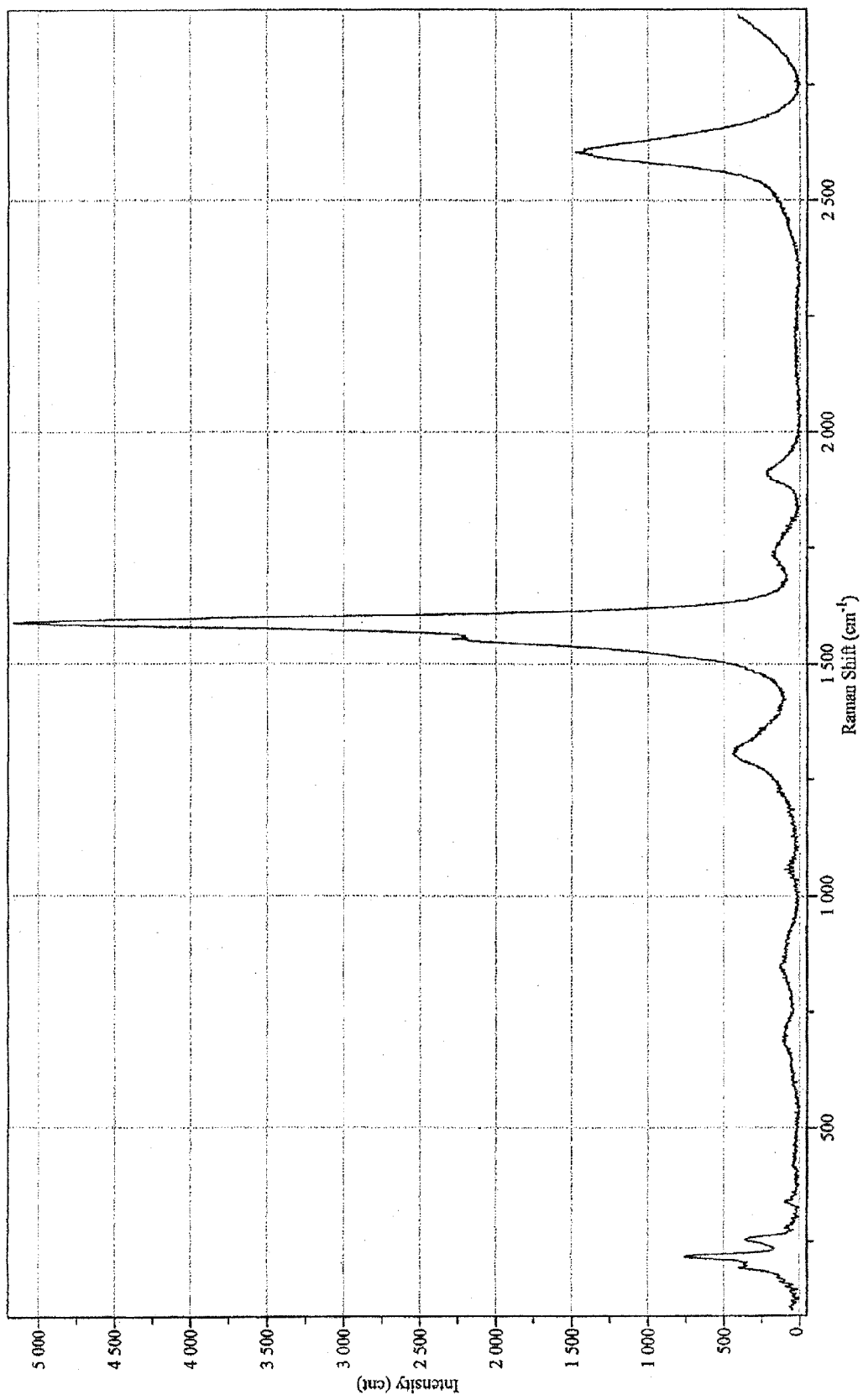
FIG. 4 is a graph depicting the D/G ratio of the sample prepared in Example 2.
Figure 5:
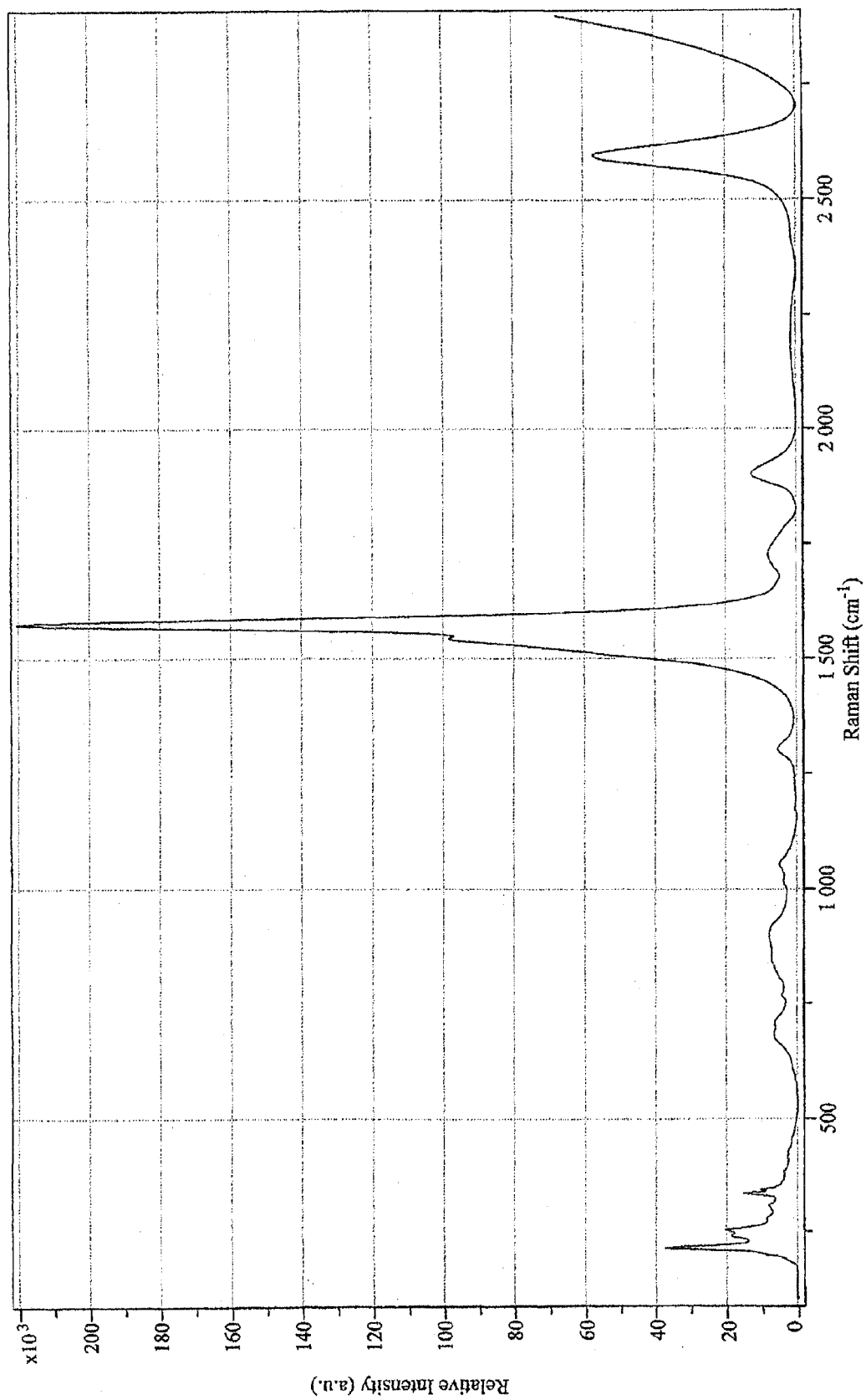
FIG. 5 is a graph showing the D/G ratio of raw CG200 carbon nanotubes.
Figure 6:
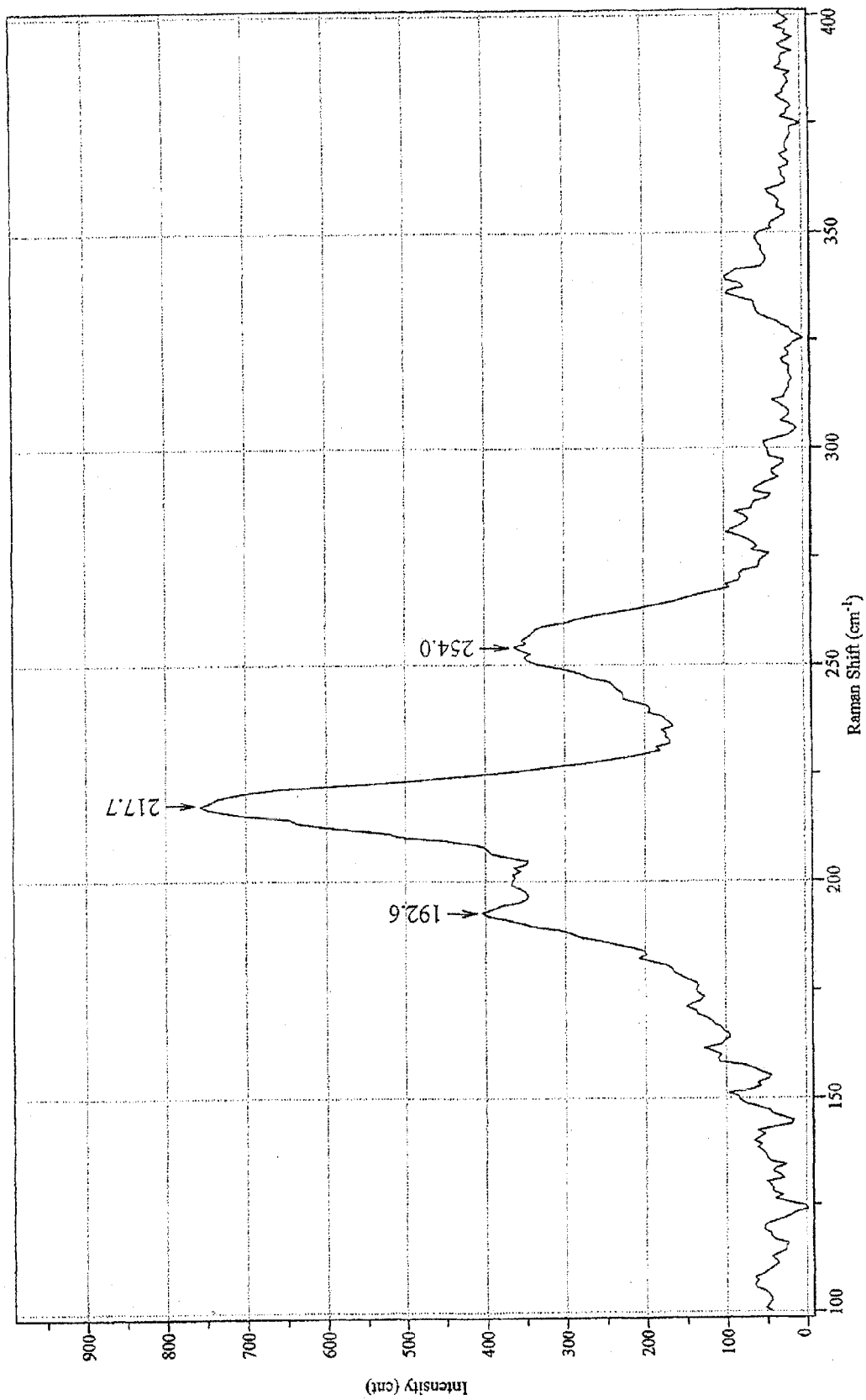
FIG. 6 is a graph illustrating the Raman spectrum of the sample prepared in Example 2.
Figure 7:
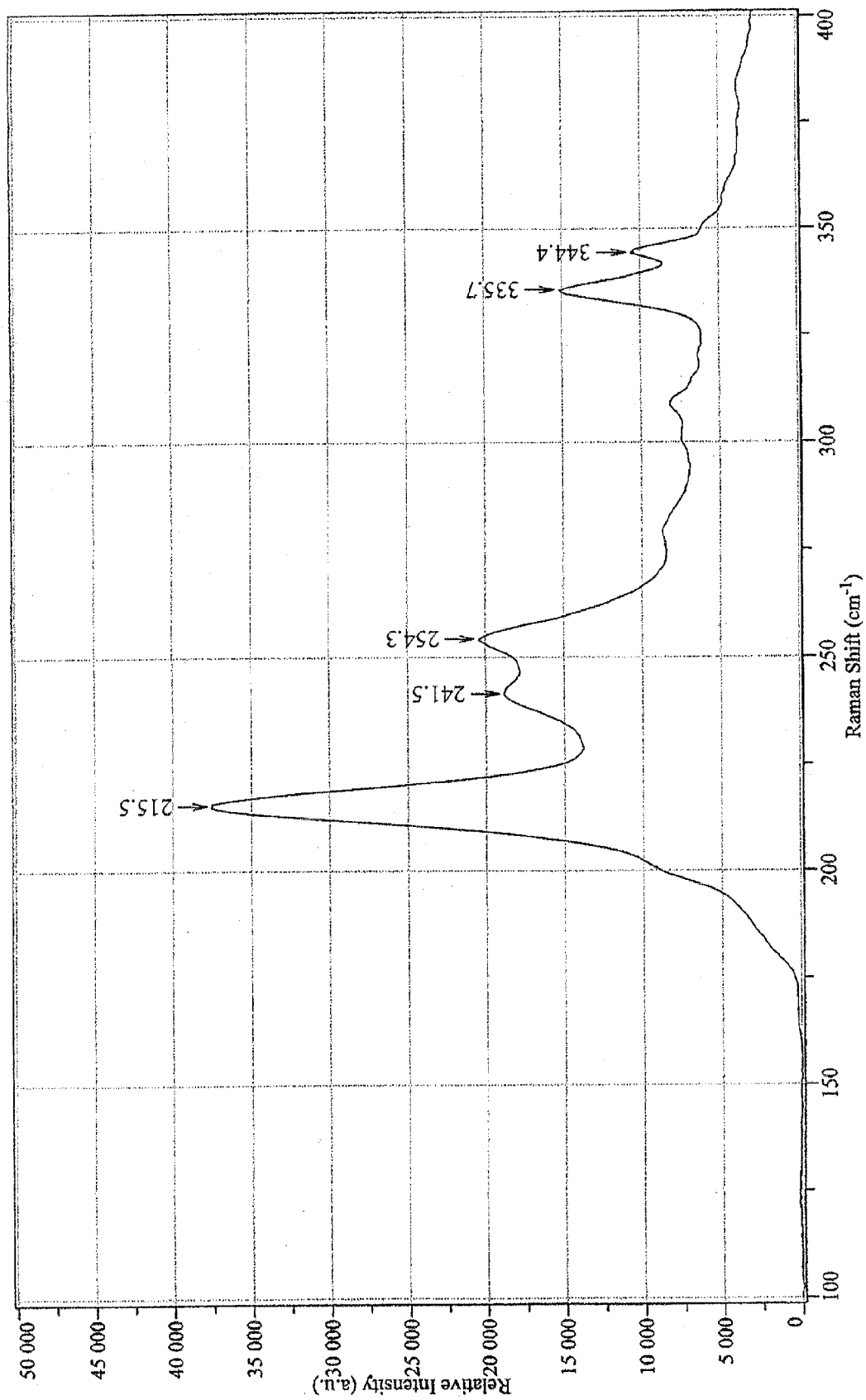
FIG. 7 is a graph depicting the Raman spectrum of raw CG200 carbon nanotubes.

The recovered wet solid was sonicated into 250 mL of pH 8.8 ammonium hydroxide and centrifuged at 22.5 krpm for 30 minutes. The resulting solution had an Optical Density (OD) of 1.85 at 550 nm. The concentration was 0.089 g/L by filter disk. The D/G ratio was measured at 0.119 (633-nm laser; see FIG. 4). For comparison, the raw CG200 tubes had a D/G ratio of 0.016 (633-nm laser; see FIG. 5). The Raman spectra indicated that the tubes were not highly functionalized. Significant peaks in the radial breathing mode were observed at 192.6 nm, 217.7 nm, and 254.0 nm (633-nm laser, FIG. 6). Raw CG200 tubes had significant radial breathing mode peaks at 215.5 nm, 241.5 nm, 254.3 nm, 335.7 nm, and 344.4 nm (633-nm laser, FIG. 7).

The solution was spray coated on glass, and the sheet resistance of the film was measured with respect to % transmittance (% T; see Table 2).

TABLE 2

| % T | SHEET RESISTANCE (Ohm/Sq) |
|---|---|
| 97.3 | $1.40 \times 10^5$ |
| 92.6 | $1.59 \times 10^4$ |
| 85.6 | $2.79 \times 10^3$ |
| 84.9 | $2.61 \times 10^3$ |
| 76.1 | $1.23 \times 10^3$ |
| 72.7 | $9.52 \times 10^2$ |
| 70.7 | $6.79 \times 10^2$ |

Example 3

Reaction of Semi-Conducting Carbon Nanotubes with 1-Pyrenebutyric Acid

In this procedure, 320 mg of SG65 carbon nanotubes (SouthWest NanoTechnologies, Norman, Okla.), and 170 mg of 1-pyrenebutyric acid were placed in a 250-mL Schlenk flask and flushed with nitrogen. Then, 328.2 grams of fuming sulfuric acid (20% free $SO_3$) were cannulated into the flask. The solution was stirred overnight at room temperature. This solution was cannulated dropwise into 250 mL of ice cold DI water. Then, 250 mL of 29% w/v ammonium hydroxide were added dropwise. This solution was diluted with 8 liters of deionized water in a 10-liter reactor vessel. The solution was filtered using cross-flow filtration and was then recovered in 8 liters of deionized water. Next, 3 mL of 29% w/v ammonium hydroxide were added, and the solution was sonicated for 2 hours. Again, the solution was filtered using cross-flow filtration and was recovered in 8 liters of deionized water. This filtration was repeated one more time, the tubes were recovered in 4 liters of deionized water, and the pH was adjusted to 8.5 with 29% w/v ammonium hydroxide.

Figure 8:
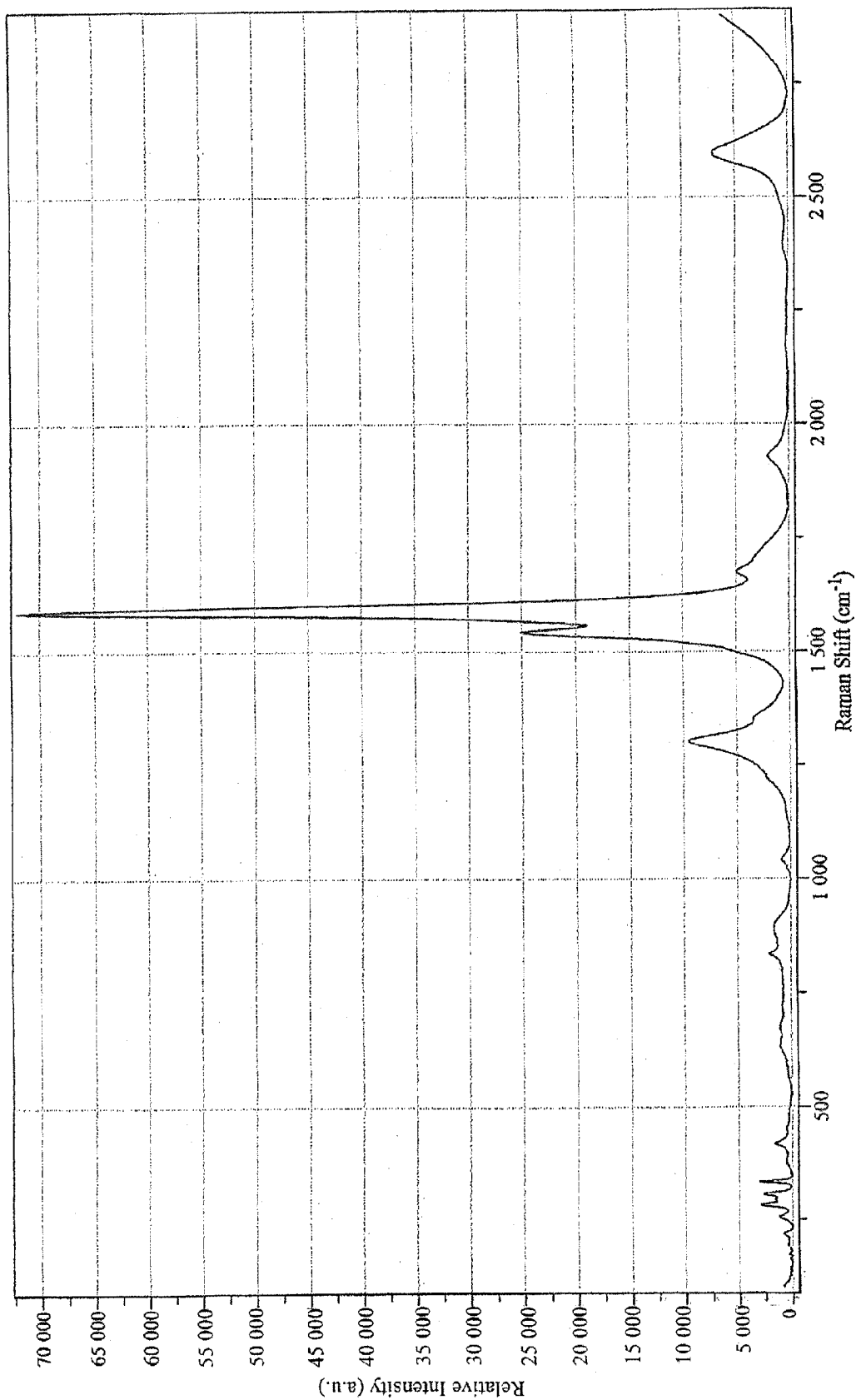
FIG. 8 is a graph depicting the D/G ratio of the sample prepared in Example 3.
Figure 9:
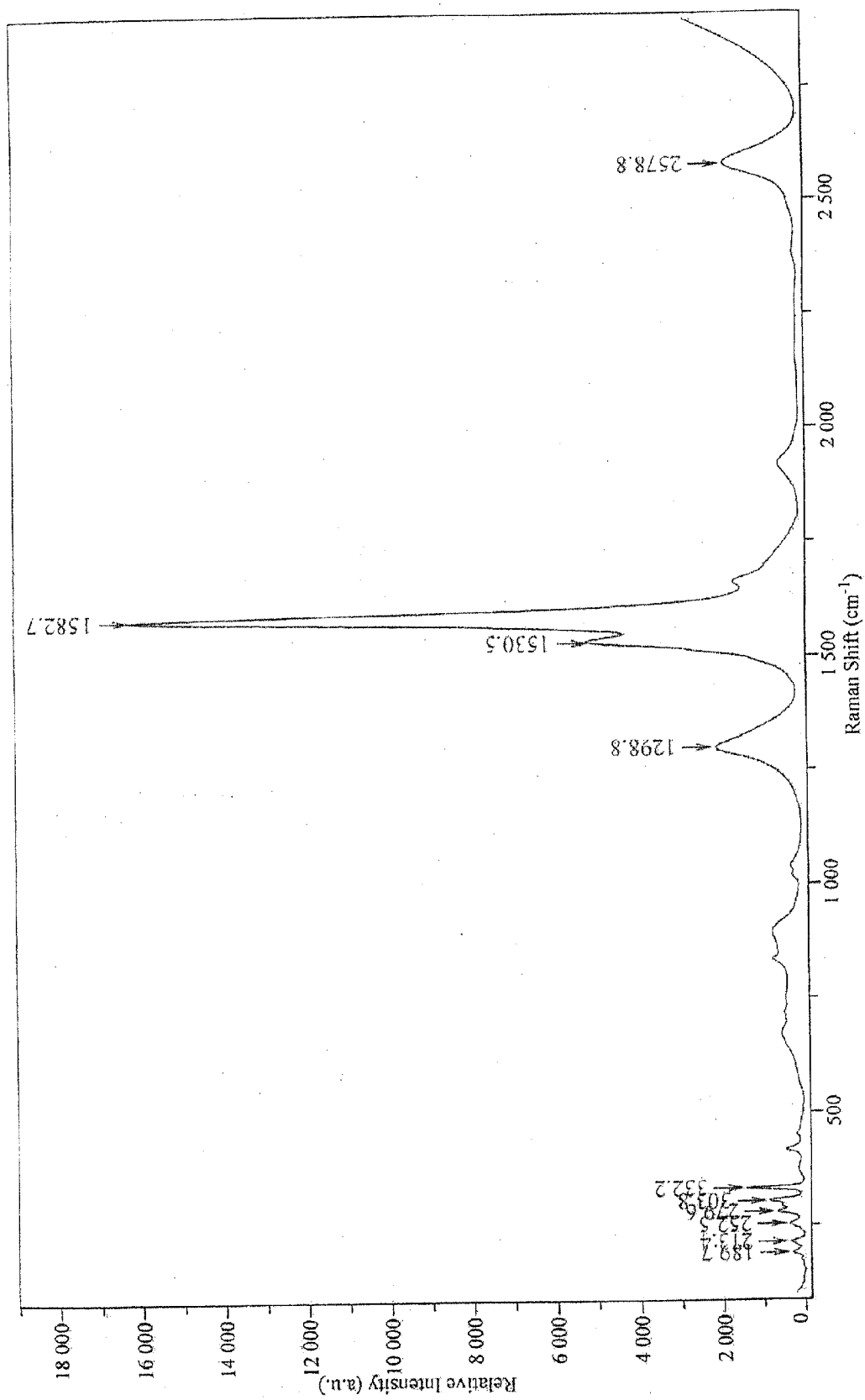
FIG. 9 is a graph showing the D/G ratio of raw SG65 carbon nanotubes.
Figure 10:
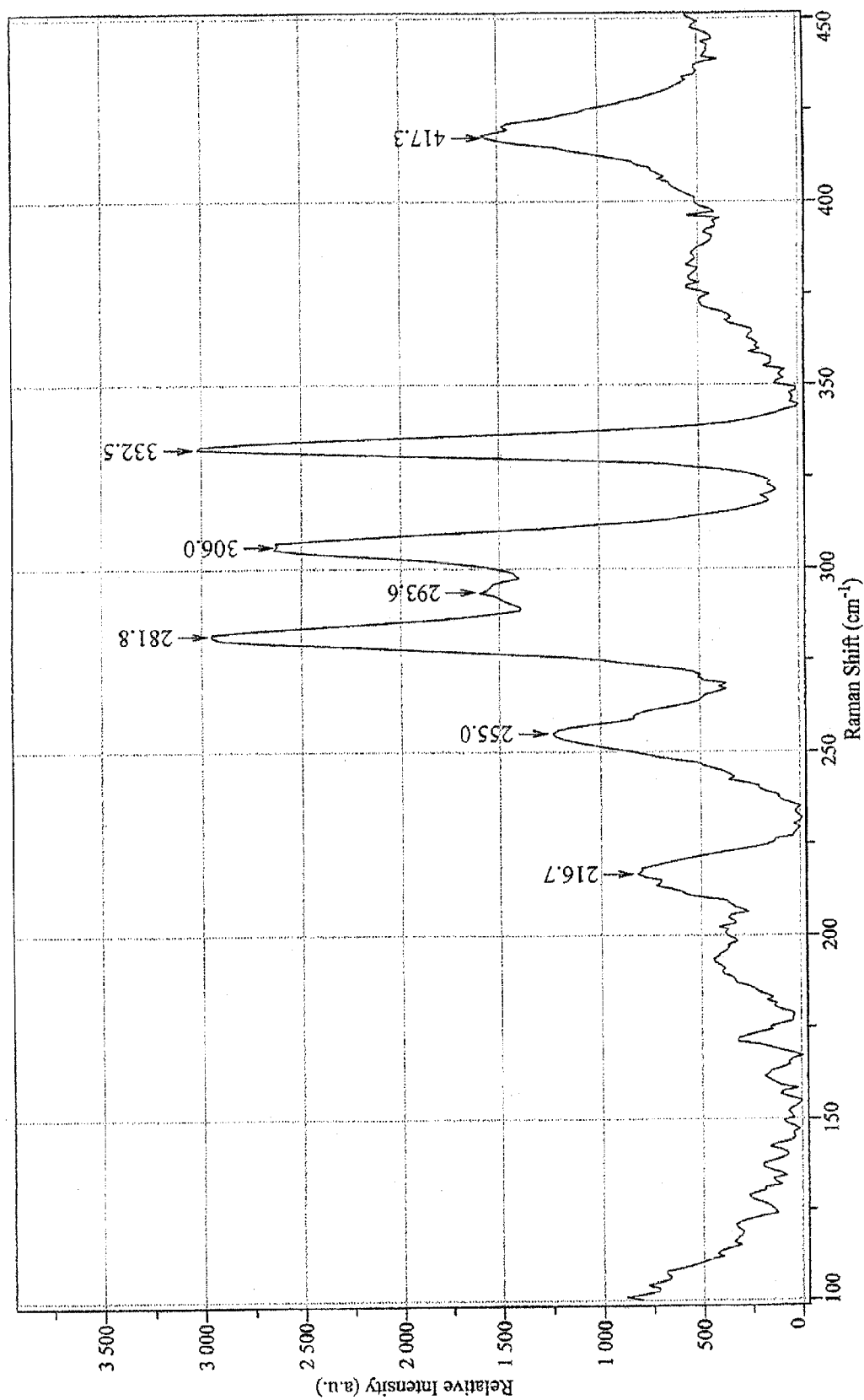
FIG. 10 is a graph illustrating the Raman spectrum of the sample prepared in Example 3.

This solution was finely dispersed. It was centrifuged twice for 30 minutes at 22.5 krpm. The resulting solution had an OD of 0.60 at 550 nm. The concentration was 0.030 g/L (as measured by filter disk). The D/G ratio was measured at 0.226 (633-nm laser, see FIG. 8). Raw SG65 tubes had a D/G ratio of 0.18 (633-nm laser, see FIG. 9). Significant peaks in the radial breathing mode were at 216.7 nm, 255.0 nm, 281.8 nm, 293.6 nm, 306.0 nm, 332.5 nm, and 417.3 nm (633-nm laser, see FIG. 10). Raw SG65 tubes had significant radial breathing mode peaks at 189.7 nm, 213.4 nm, 252.5 nm, 279.6 nm, 303.8 nm, and 332.2 nm (633-nm laser, spectrum 9).

The solution was spray coated on glass, and the sheet resistance of the film was measured with respect to % transmittance (see Table 3). The sheet resistance was quite low for a semi-conducting film.

TABLE 3

| % T | SHEET RESISTANCE (Ohm/Sq) |
|---|---|
| 95.3 | $1.88 \times 10^5$ |
| 94.6 | $3.72 \times 10^4$ |
| 92.9 | $1.91 \times 10^4$ |
| 87.6 | $5.68 \times 10^3$ |
| 85.1 | $4.99 \times 10^3$ |
| 80.6 | $2.71 \times 10^3$ |
| 79 | $2.33 \times 10^3$ |

Example 4

Reaction of Carbon Nanotubes with 1-Pyrenemethylamine Hydrochloride

In this Example, 840 mg of CG200 carbon nanotubes and 1,230 mg of 1-pyrenemethylamine hydrochloride (Product No. 401633, Sigma Aldrich, St. Louis, Mo.) were placed in a 3-liter, 3-neck round-bottom flask and flushed with nitrogen. Then, 1.35 liters of concentrated sulfuric acid (Product No. 435589, Sigma Aldrich, St. Louis, Mo.) were poured into the flask. This solution was cannulated dropwise into 3.0 liters of an ice cold solution of 50% by volume ammonium hydroxide (29% by weight) in DI water. The resulting solution was stirred overnight. After stirring, the solution was diluted with 8 liters of DI water in a 10-liter reactor vessel. This solution was sonicated for 2 hours (Blackstone-Ney Ultrasonics Model PROHT 1212 sonicator with Neptune Ultrasonics generator Model N1500-C-XHSKA-120-480/12 with potentiometer set at maximum, power having been measured at 40-45 W/in$^2$) with the temperature set at 3° C. The solution was filtered using cross-flow filtration with sonication and then recovered in 8 liters of deionized water twice. Next, 3 mL of 29% w/v ammonium hydroxide were added, and the solution was filtered using cross-flow filtration with sonication and recovered in 4 liters of deionized water. Finally, 3 mL of 29% w/v ammonium hydroxide were added, and the solution was sonicated for 2 hours.

The resulting solution was highly dispersed. It was centrifuged for 30 minutes at 22.5 krpm. A 1:2 dilution of this solution in DI water had an OD of 1.42 at 550 nm. Its concentration was measured to be 0.132 g/L by filter disk. After filtration, 3.4753 grams of wet product were recovered. TGA of this sample determined that it was 18.67% solids, giving a total weight of 0.649 grams, or 81% yield. A small decomposition was observed at 272.62° C. The $T_{Onset}$ was found to be 500.48° C., and residue was 12.91%.

Figure 11:
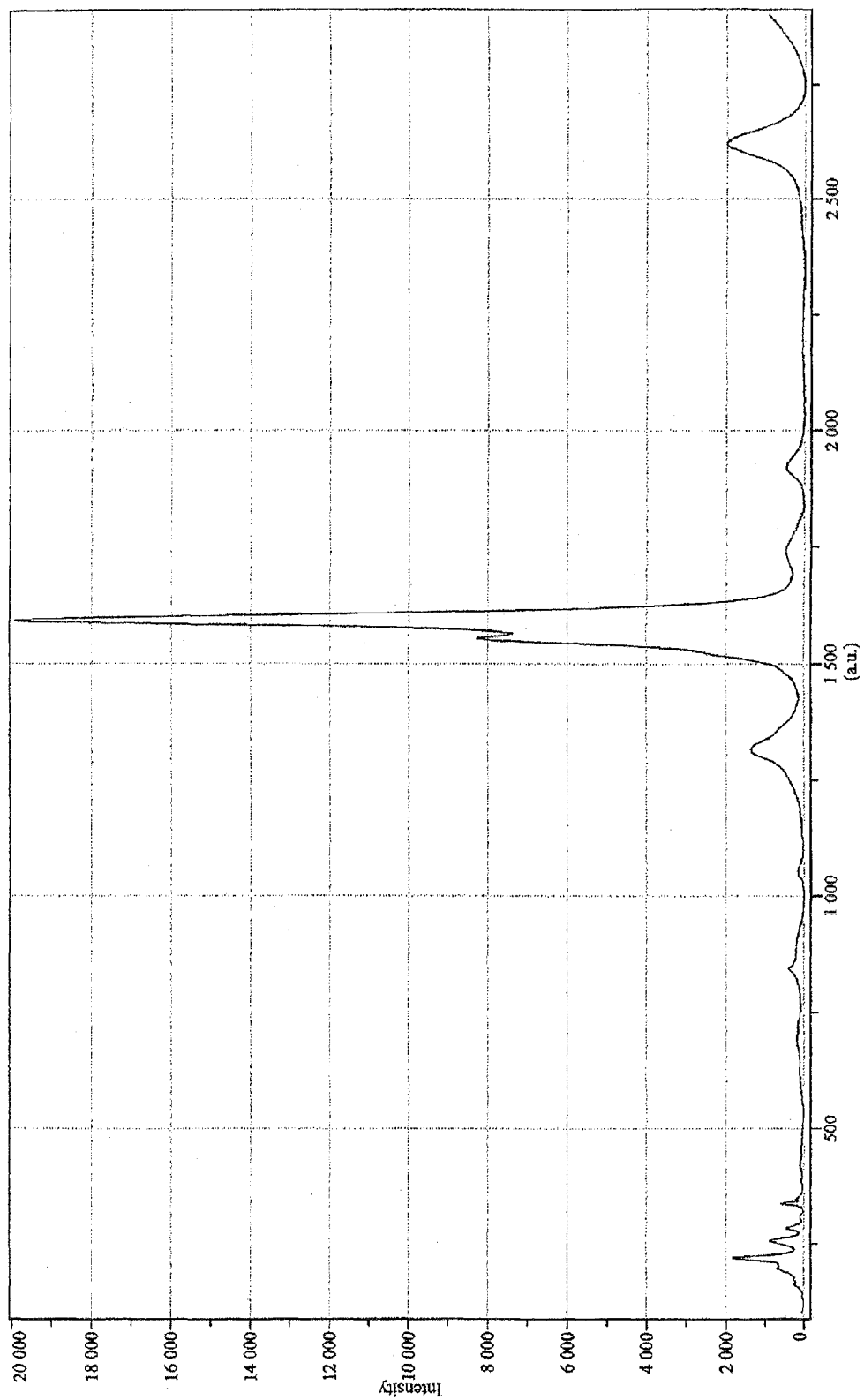
FIG. 11 is a graph depicting the D/G ratio of the sample prepared in Example 4.
Figure 12:
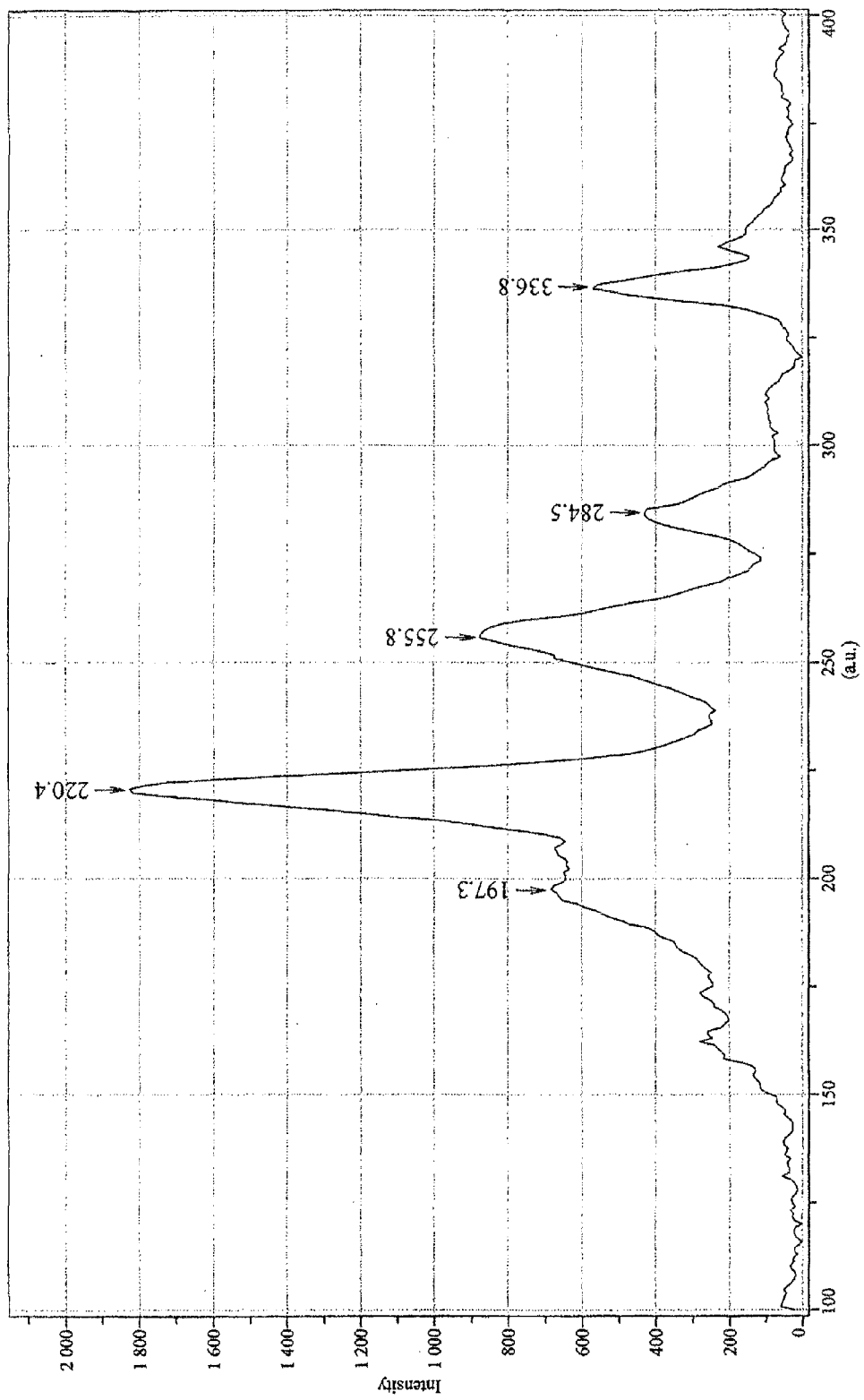
FIG. 12 is a graph illustrating the Raman spectrum of the sample prepared in Example 4.

The D/G ratio was measured at 0.010 (633-nm laser, see FIG. 11). Raw CG200 tubes had a D/G ratio of 0.016 (633-nm laser, see FIG. 5). Significant peaks in the radial breathing mode were at 197.3 nm, 220.4 nm, 255.8 nm, 284.5 nm, and 336.8 nm (633-nm laser, see FIG. 12). Raw CG200 had significant radial breathing mode peaks at 215.5 nm, 241.5 nm, 254.3 nm, 335.7 nm and 344.4 nm (633-nm laser, see FIG. 7).

The solution was spray coated on glass, and the sheet resistance of the film was measured with respect to % transmittance.

TABLE 4

| % T | SHEET RESISTANCE (Ohm/Sq) |
|---|---|
| 95.4 | $1.19 \times 10^4$ |
| 92.8 | $4.18 \times 10^3$ |
| 91.8 | $3.31 \times 10^3$ |
| 86.4 | $1.40 \times 10^3$ |
| 86.9 | $1.46 \times 10^3$ |
| 84.4 | $1.12 \times 10^3$ |
| 84 | $9.66 \times 10^2$ |
| 79.1 | $6.00 \times 10^2$ |
| 73.7 | $4.50 \times 10^2$ |

Example 5

Reaction of Carbon Nanotubes with 1-Pyrenemethylamine Hydrochloride

In this Example, 458 mg of XBC3350 carbon nanotubes (Continental Carbon Nanotechnologies, Inc. 16850 Park Row, Houston, Tex., 77084) and 484 mg of 1-pyrenemethylamine HCl (Product No. 401633, Sigma Aldrich, St. Louis, Mo.) were placed in 150 mL of chlorosulfonic acid (Product No. 571024, Sigma Aldrich, St. Louis, Mo.) under nitrogen. This was stirred for 3 days. The solution was cannulated drop wise into 409 grams of ice and kept cold in an ice bath. Carbon nanotubes remaining in the flask were washed into the quenched solution with 20 mL of DI water. Using an addition funnel, 290 mL of 29% w/v ammonium hydroxide (29% by weight, Product No. 5820, J.T. Baker, Phillipsburg, N.J.) were added drop wise. The solution was kept cold during this process with an ice bath. The solution was stirred overnight at room temperature. The solution was then cooled in ice and 250 mL of 29% w/v ammonium hydroxide were added dropwise. The pH was measured to be 9.8 at the end of this process.

A portion of this carbon nanotube slurry was then filtered for two days through a 10-μm polycarbonate filter. The resulting carbon nanotube cake had partially dried and looked and behaved like clay. The remainder of the slurry was added to the filter washing the flask with 100 mL DI water into the filter. The carbon nanotube clay was removed from the filter and 250 mL of pH 10.3 ammonium hydroxide in DI water was added in small portions while vigorously stirring. This addition began with 5 mL portions each time, mixing the clay with the ammonium hydroxide until it was uniform. Eventually, it became a gel. When the solution was sufficiently fluid, 50 mL portions were added with vigorous stirring. Once all 250 mL of ammonium hydroxide were added, the mixture was filtered through a 10-μm polycarbonate filter.

This CNT clay was sonicated into 600 mL of pH 10.3 ammonium hydroxide in DI water in two, 300-mL portions. Sonication conditions were 45 minutes at 90% power with a 1-inch probe with the booster attachment. During this process, the solution was in a cooling bath set at 5° C. This solution was centrifuged at 23.5 krpm for 30 minutes. The final solution was pipetted off of the top of the centrifuge tube.

Figure 13:
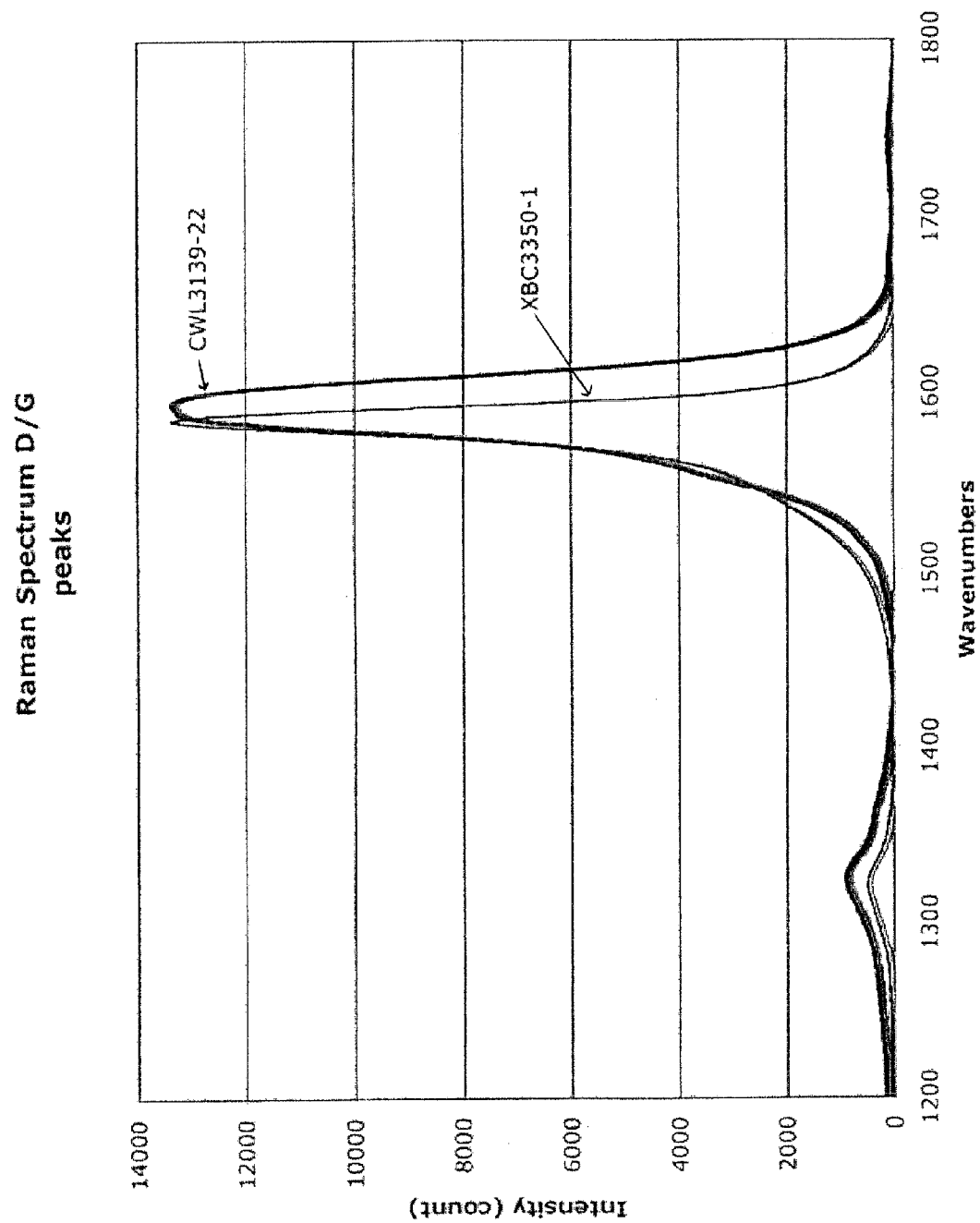
FIG. 13 is a graph depicting the D/G ratios of the sample prepared in Example 5 and of XBC3350 carbon nanotubes (for readability, the spectrum for the XBC3350 was multiplied by a factor of 0.473)
Figure 14:
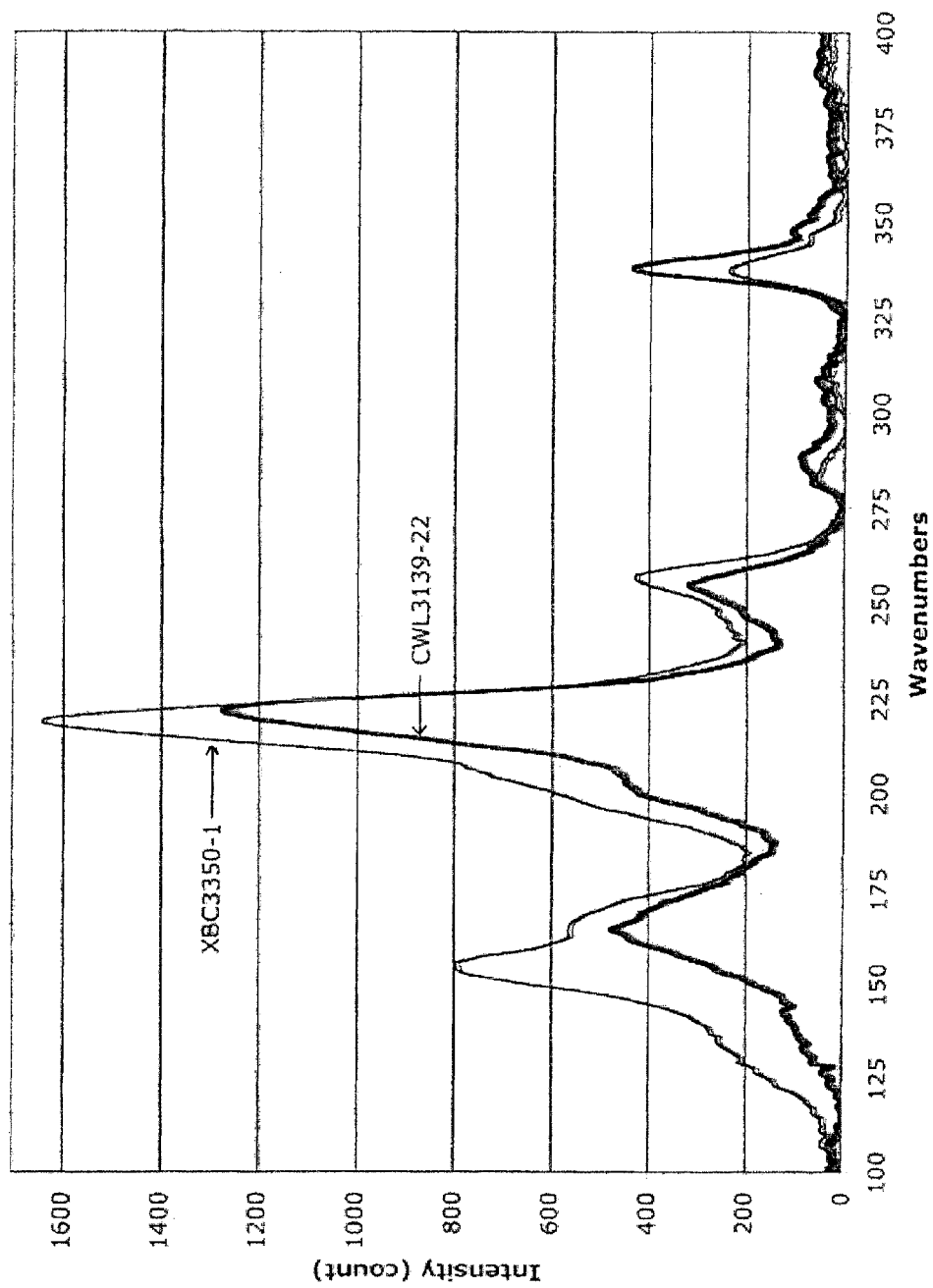
FIG. 14 is a graph depicting the Raman spectra of the sample prepared in Example 5 and of XBC3350 carbon nanotubes (for readability, the spectrum for the XBC3350 was multiplied by a factor of 0.473)

The concentration of this solution was measured to be 1.088 g/L, based on a filter disk. The solution was very well dispersed, easily passing through a 10-μm polycarbonate filter without leaving any residue. The solution was diluted 10× and spray coated on glass to measure sheet resistance vs % transparency (shown in Table 5). The D/G ratio was measured at 0.109 (633-nm laser, see FIG. 13). Raw XBC3350 tubes had a D/G ratio of 0.057 (633-nm laser, see FIG. 13). Significant peaks in the radial breathing mode were at 164.6 nm, 221.8 nm, 255.1 nm, and 338.2 nm (633-nm laser, see FIG. 14). Raw XBC3350 tubes had significant radial breathing mode peaks at 154.5 nm, 166.0 nm, 218.6 nm, 256.5 nm, and 337.2 nm (633-nm laser, see FIG. 14).

TABLE 5

| % T | SHEET RESISTANCE (Ohm/Sq) |
|---|---|
| 94.4 | $1.51 \times 10^3$ |
| 88.3 | $5.35 \times 10^2$ |
| 84.5 | $3.15 \times 10^2$ |
| 79.6 | $2.29 \times 10^2$ |
| 77.1 | $2.06 \times 10^2$ |

Example 6

Reaction of Carbon Nanotubes with Rubrene

In this procedure, 220 mg of carbon nanotubes and 230 mg of rubrene (Product No. R2206, Sigma Aldrich, St. Louis, Mo.) were stirred in 100 mL of fuming sulfuric acid (20% free $SO_3$, Product No. 435597, Sigma Aldrich, St. Louis, Mo.) under nitrogen for 2 days. This was then quenched dropwise into 250 mL of ice-cooled, DI water. Next, 250 mL of ammonium hydroxide (24% by weight, Product No. 09870, Sigma Aldrich, St. Louis, Mo.) were added dropwise over 1 hour. This solution was poured into a 10-liter reactor with 4 liters of DI water and sonicated for 17 hours. The pH at this point was measured to be 1.98. The solution was filtered through a cross flow filtration and then recovered in 2 liters of DI water. The pH was adjusted with 6 mL of ammonium hydroxide (24% w/v) sonicated for 2 hours, and then filtered through the cross flow filtration. Again, the solution was recovered in 2 liters of DI water, basified with 6 mL of ammonium hydroxide (24% w/v), and sonicated for two hours. The solution was filtered again, recovered in 2 liters of DI water, and basified with 6 mL of ammonium hydroxide (24% w/v). This solution was sonicated overnight. Finally, 250 mL of this solution were removed and centrifuged at 23.5 krpm for 30 minutes.

The OD of this solution was measured to be 1.34 at 550 nm. The solution was spray coated on glass, and its sheet resistance was measured relative to transparency (Table 6).

TABLE 6

| % T | SHEET RESISTANCE (Ohm/Sq) |
|---|---|
| 91.4 | $4.47 \times 10^4$ |
| 84.9 | $4.29 \times 10^3$ |
| 79.8 | $2.76 \times 10^3$ |
| 74.9 | $1.69 \times 10^3$ |
| 68.8 | $1.43 \times 10^3$ |

The coatings from the initial solution were blotchy, which indicated more washing would be necessary to improve conductivity. The solution remaining in the reactor was filtered using cross flow filtration, recovered in 2 liters of DI water, basified with 3 mL of 29% w/v ammonium hydroxide, and then sonicated for 24 hours. Next, 250 mL of this solution were removed from the reactor and centrifuged at 23.5 krpm for 30 minutes.

Figure 15:
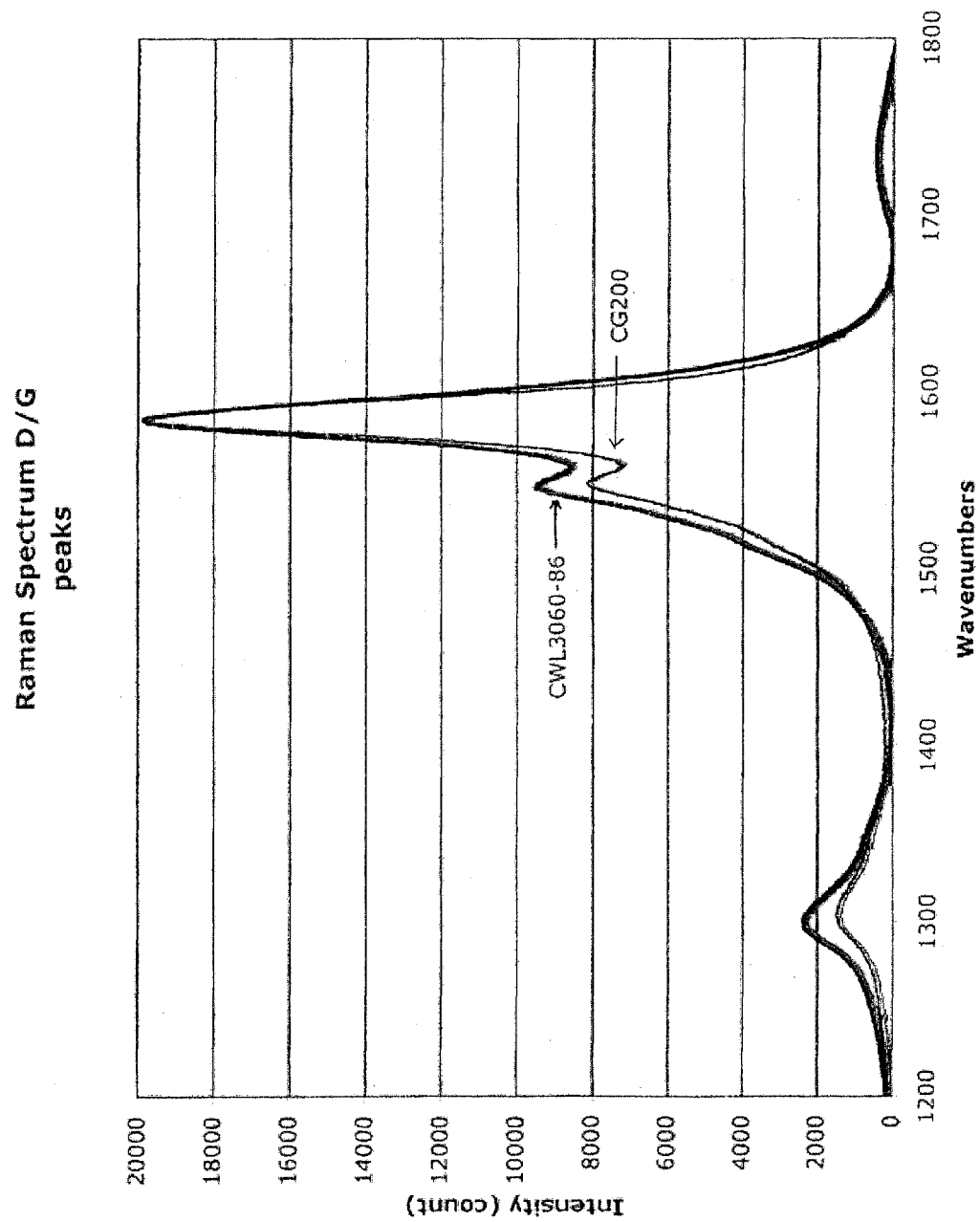
FIG. 15 is a graph showing the D/G ratios of the second sample prepared in Example 6 and of CG200 carbon nanotubes (for readability, the spectrum for the CG200 was multiplied by a factor of 4.212)
Figure 16:
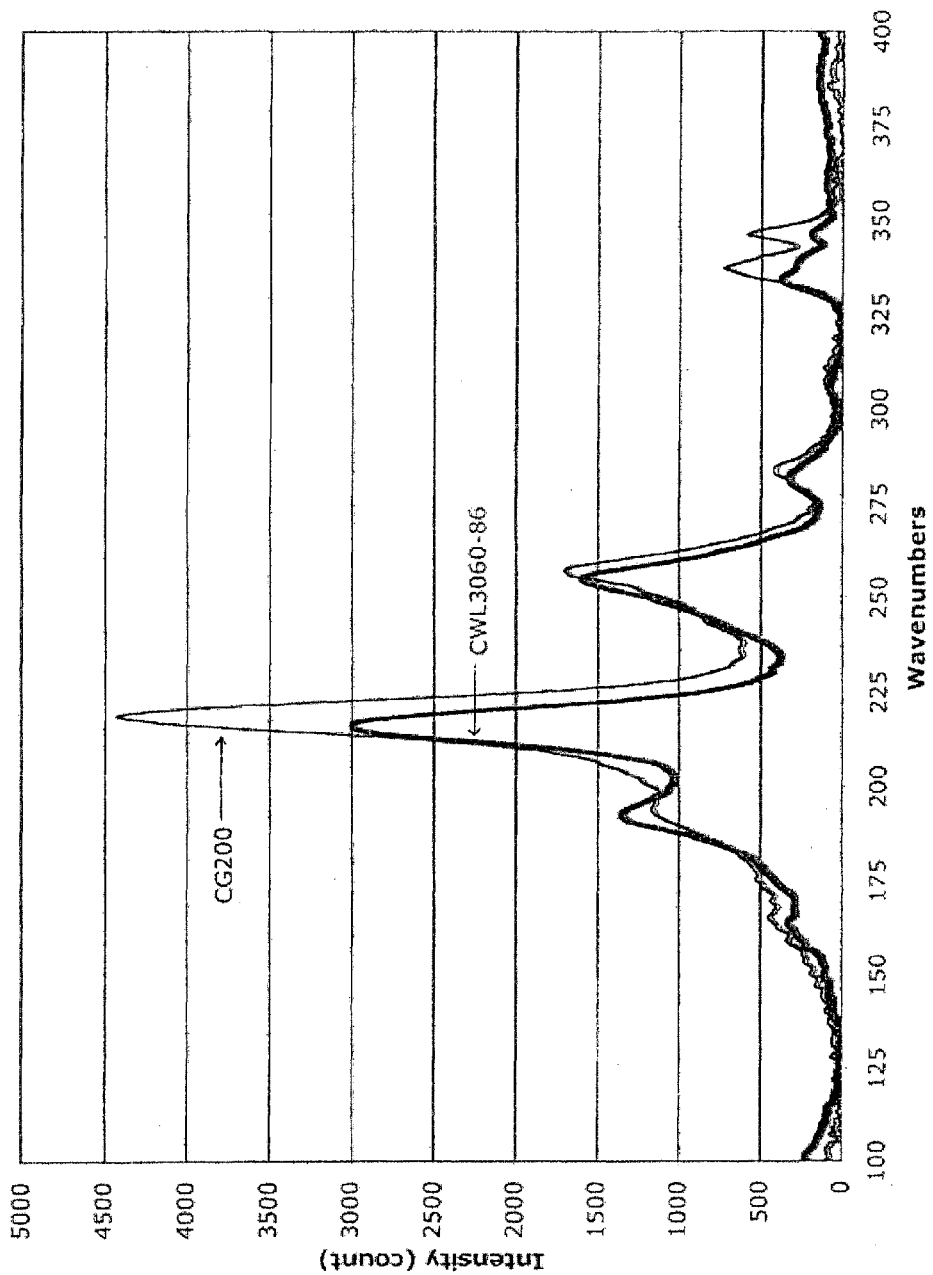
FIG. 16 is a graph depicting the Raman spectra of the second sample prepared in Example 6 and of CG200 carbon nanotubes (for readability, the spectrum for the CG200 was multiplied by a factor of 4.212)

The OD of the second solution was measured to be 1.21 at 550 nm. The concentration was measured to be 0.0612 g/L based (determined by a filter disk). This solution was spray coated, and its sheet resistance was measured relative to transparency (see Table 7). The coating was uniform. The D/G ratio was measured to be 0.138 (633-nm laser, see FIG. 15). Raw CG200 tubes had a D/G ratio of 0.075 (633-nm laser, see FIG. 15). Significant peaks in the radial breathing mode were observed at 192.4 nm, 216.0 nm, 254.9 nm, 282.5 nm, and 334.2 nm (633-nm laser, see FIG. 16). Raw CG200 tubes had significant radial breathing mode peaks at 193.5 nm, 218.6 nm, 257.1 nm, 283.7 nm, 337.5 nm and 346.1 nm (633-nm laser, see FIG. 16).

TABLE 7

| % T | SHEET RESISTANCE (Ohm/Sq) |
|---|---|
| 94.3 | $3.67 \times 10^4$ |
| 89.2 | $5.62 \times 10^3$ |
| 83.5 | $3.26 \times 10^3$ |
| 79.6 | $2.04 \times 10^3$ |
| 75.4 | $1.56 \times 10^3$ |

Example 7

Reaction of Carbon Nanotubes with Fuming Sulfuric Acid (No Aromatic Hydrocarbon)

In this Example, 219 mg of CG200 carbon nanotubes were placed in 182.8 grams of fuming sulfuric acid (20% free $SO_3$, Product No. 435597, Sigma Aldrich, St. Louis, Mo.) under nitrogen and stirred overnight. The solution was cannulated into 250 mL of ice cold DI water. This solution was then neutralized with 250 mL of 29% w/v ammonium hydroxide (29% by weight, Product No. 5820, J.T. Baker, Phillipsburg, N.J.). This mixture or dispersion was then filtered through a 10-µm polycarbonate filter (Isopore™ membrane filter, Catalog No. TCTP 04700, 47-mm diameter, Millipore, Billerica, Mass.) with stirring to prevent buckypaper from forming on the filter surface. The resulting tubes were stirred into 500 mL of DI water and filtered three times. The tubes were then placed in 500 mL of pH 10.5 ammonium hydroxide and sonicated overnight in the bath sonicator. The solution was highly bundled with no dispersion, indicating that the reaction of CNTs with fuming sulfuric acid was insufficient to functionalize the tubes.

Example 8

Reaction of CG200 Carbon Nanotubes with 1-Pyrenemethylamine Hydrochloride (No Acid)

In this procedure, 202 mg of CG200 carbon nanotubes, 210 mg of 1-pyrenemethylamine hydrochloride, and 1 liter of pH 10.2 ammonium hydroxide in DI water were combined in a 10-liter reactor. The solution was sonicated in the bath sonicator for 12 hours, and checked for dispersion. The mixture was not dispersed. The mixture was sonicated for an additional 17 hours and checked for dispersion. The mixture was still not dispersed. A liter of DI water was added to reduce the concentration. The mixture was then sonicated for another 24 hours and checked for dispersion. Again, the mixture was still not dispersed, indicating that the 1-pyrenemethylamine HCl was not sufficient to solubilize or disperse the CNTs in the absence of the strong acid under the above conditions.

Example 9

Reaction of Carbon Nanotubes with 1,3,6,8-Pyrenetetrasulfonic Acid Tetrasodium Salt Hydrate (No Acid)

In this Example, 367 mg of CG200 carbon nanotubes, 267 mg of 1,3,6,8-pyrenetetrasulfonic acid tetrasodium salt hydrate (Product No. 82658, Sigma Aldrich, St. Louis, Mo.), and 250 mL of pH 10.0 ammonium hydroxide were sonicated for 15 hours then allowed to sit overnight. This solution was centrifuged at 22.5 krpm for 30 minutes, and the dispersed liquid was collected. The OD of the resulting solution was measured to be 0.53 at 550 nm. This solution was spray coated on glass, but none of the slides were conductive. This demonstrated that sulfonated pyrene compounds can solubilize carbon nanotubes, but the resulting solutions are very dilute. Additionally, the solutions that result from this process do not produce conductive coatings when spray coated.

Example 10

Reaction of 1-Pyrenemethylamine Hydrochloride with Fuming Sulfuric Acid to Characterize Reaction Products In this Example, 1.958 grams of 1-pyrenemethylaminehydrochloride (Product No. 401633, Sigma Aldrich, St. Louis, Mo.) were placed in 75 mL of fuming sulfuric acid (20% free $SO_3$, Product No. 435597, Sigma Aldrich, St. Louis, Mo.) under nitrogen and stirred at room temperature for 24 hours. This mixture was cannulated into 75 mL of DI water chilled in an ice bath. Then, 75 mL of 24% w/v ammonium hydroxide (Product No. 09870, Sigma Aldrich, St. Louis, Mo.) were added drop wise, while continuing to cool. The pH was measured to be 0.3. Ammonium hydroxide was then slowly added until the pH was 7.7. The temperature was kept below 25° C. during the entire process.

After 5 days, a yellow precipitate had formed. The solution was shaken, and a small aliquot was taken to test solubility characteristics. The precipitate quickly dissolved when 0.5 mL of 24% w/v ammonium hydroxide was added. The precipitate was filtered through a 10-µm polycarbonate filter, and the solid was collected. This solid dissolved in 200 mL of DI water easily. The solution was placed in a 400-mL beaker and stirred under a stream of air with the hotplate set at 107° C. This liquid was concentrated down to about 3 mL before it started to precipitate out, followed by filtering to yield a silvery wet solid. This was dissolved in 3 mL of DI water and placed in a scintillation vial. The solution was again evaporated until it precipitated out. The solid was collected and dried under vacuum.

Figure 17:
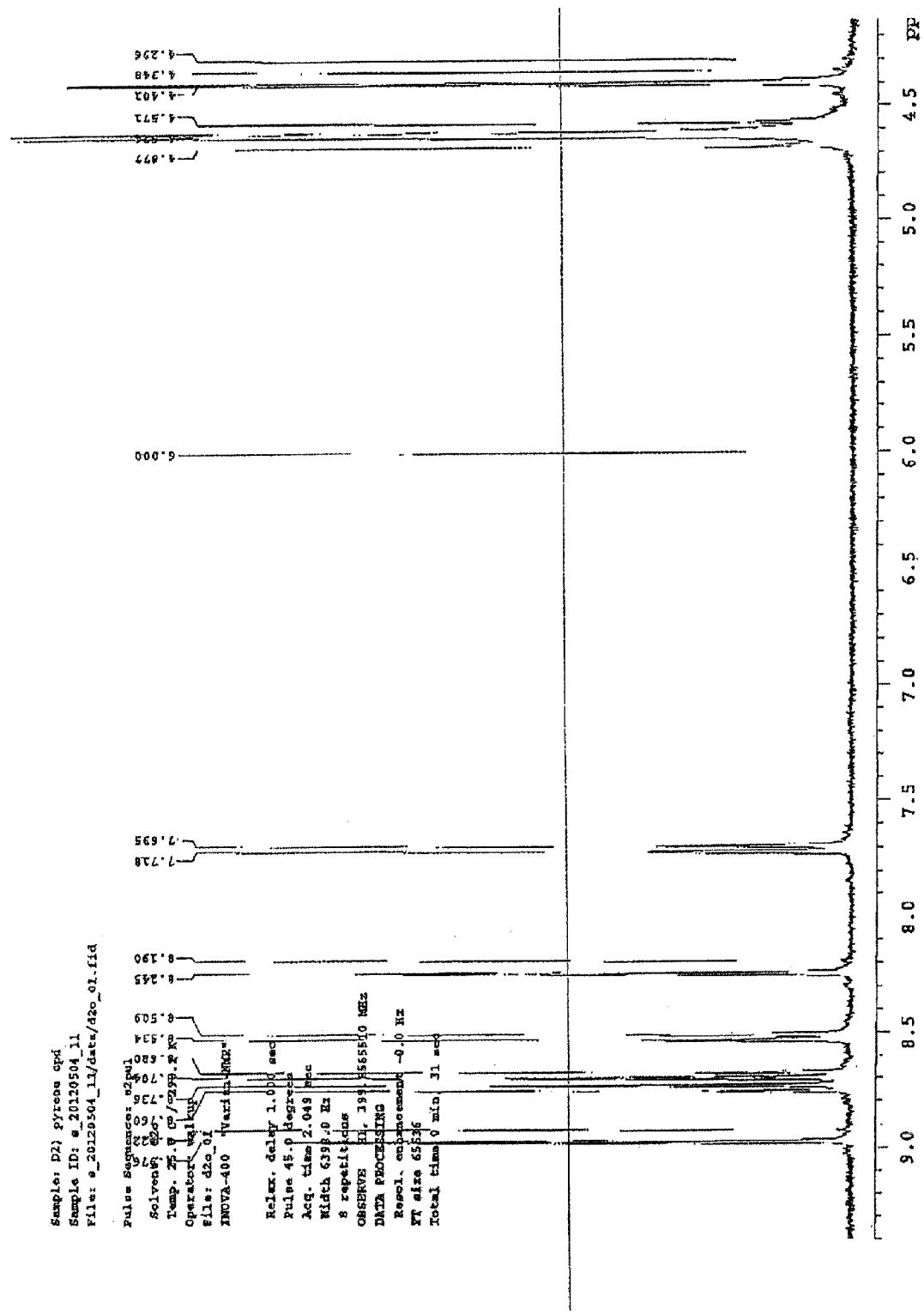
FIG. 17 provides the NMR spectrum of the reaction product of 1-pyrenemethylamine hydrochloride with fuming sulfuric acid.

Next, 10 mg of the dried solid was placed in 1.0 mL of deuterated water in a 0.7 mL NMR tube. The spectrum was taken on a 400 MHZ INOVA 400 Varian NMR. Significant peaks were observed at 8.976 ppm (s), 8.748 (d, JH=6.0 Hz), 8.692 (d, JH=6.0 Hz), 8.522 (d, JH=6.3 Hz), 8.245 (s), 7.707 (d, JH=5.8 Hz), 4.624 (s, isotopic satellites JD=26.5 Hz), and 4.401 (s). This spectrum is shown in FIG. 17.

Figure 18:
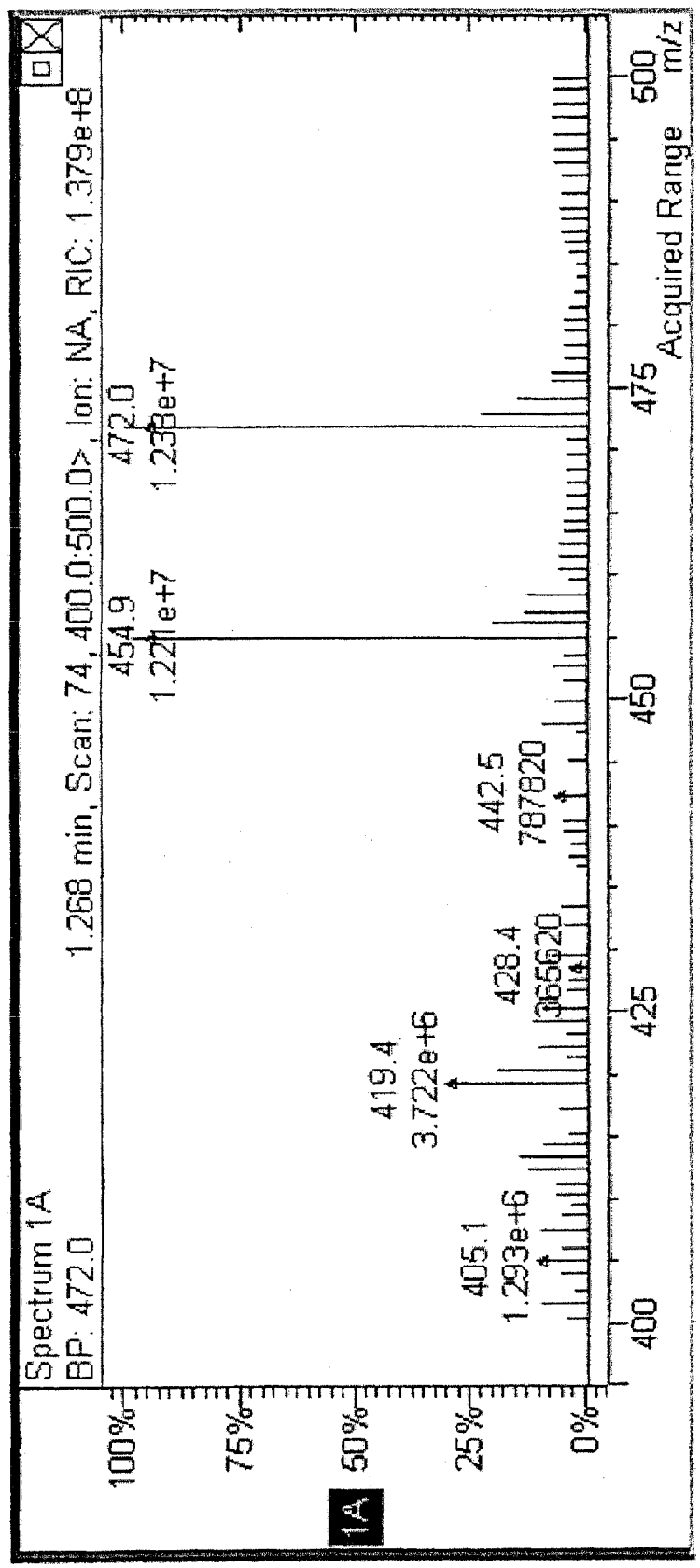
FIG. 18 shows the mass spectrum of the reaction product of 1-pyrenemethylamine hydrochloride with fuming sulfuric acid.

A mass spectrum was obtained by dissolving the sample in 50:50 methanol:water and injecting the filtered sample directly into the ESI mass spectrometer. FIG. 18 shows the mass spectrum of the reaction product. Table 8 shows the isotropic ion abundances for the molecular mass region.

TABLE 8

| m/z | REL. INTENSITY |
|-----|----------------|
| 455 | 78 |
| 456 | 17.0 |
| 457 | 13.0 |
| 472 | 100 |
| 473 | 22.1 |
| 474. | 16.5 |

Figure 19:
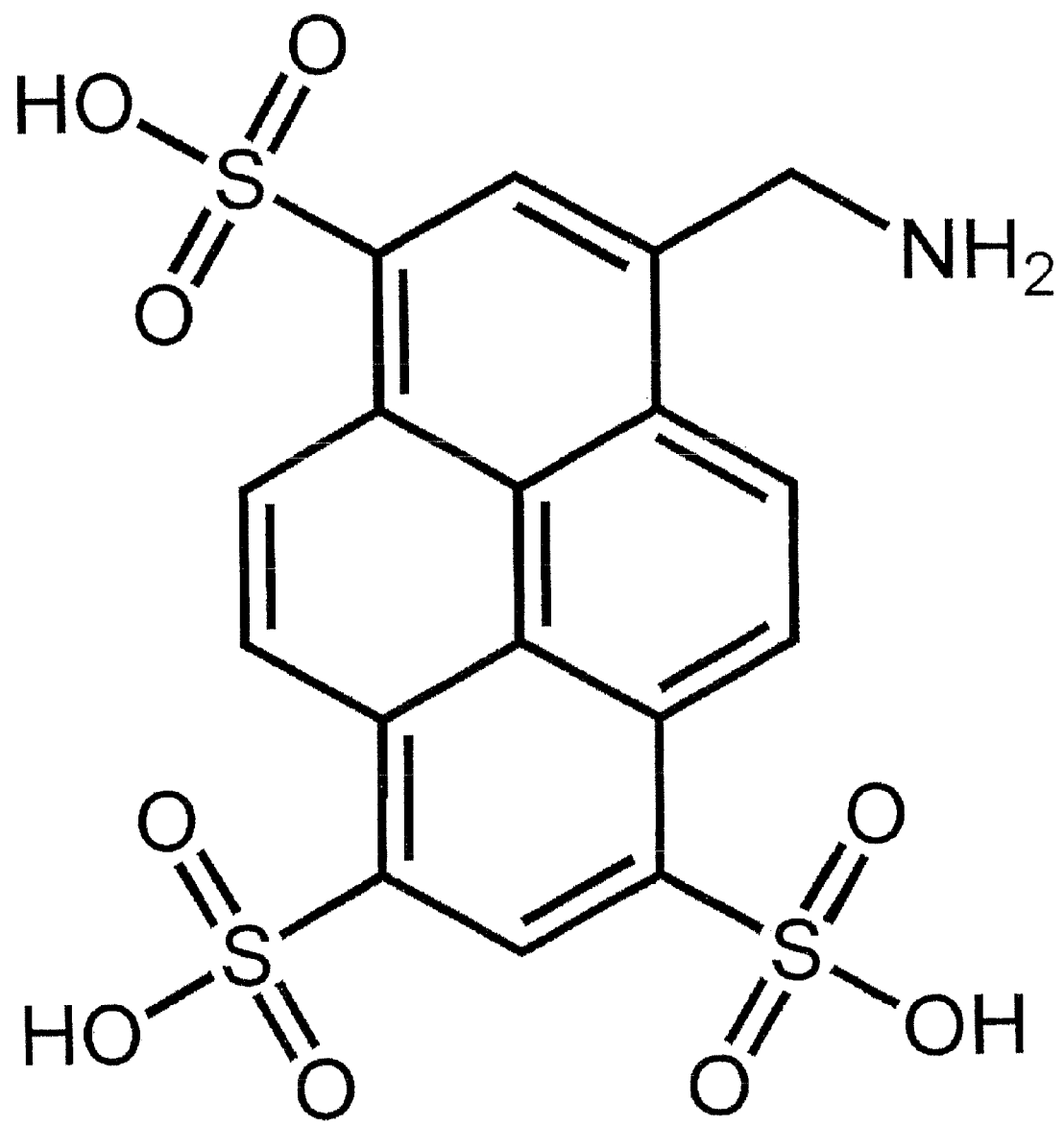
FIG. 19 shows the chemical structure of the reaction product of 1-pyrenemethylamine hydrochloride with fuming sulfuric acid.

The molecular mass of the reaction product was 471 Da. The isotropic abundances indicated that the molecular formula was $C_{17}H_{13}NO_9S_3$. Based on the $^1$H NMR and the mass spectrum, the reaction product was 1-pyrenemethylamine-3,6,8-trisulfonic acid (see FIG. 19).

Example 11

Attempted Solubilization of Carbon Nanotubes with 1-Pyrenemethylamine-3,6,8-Trisulfonic Acid A purified sample (1.58 grams) of 1-pyrenemethylamine-3,6,8-trisulfonic acid synthesized as described in Example 10 was placed in a stainless steel beaker with 213 mg XBC 3350 carbon nanotubes (Continental Carbon Nanotechnologies, Inc., Houston, Tex.) in 250 mL of pH 10.3 ammonium hydroxide. The slurry was sonicated with a 1-inch probe sonicator set at 90% power for 45 minutes in a chilled bath, and the solution was allowed to cool. The slurry was sonicated for an additional 1 hour, and then centrifuged at 23.5 krpm for 30 minutes. The measured optical density of the resulting solution at 550 nm was 2.25. The concentration (measured by filter disk) was 0.0736 g/L. Both the OD and the concentration of the solution were an order of magnitude lower than that obtained by the inventive process of Example 5.

We claim:

1. A dispersion comprising carbon nanotubes noncovalently bonded to compounds comprising respective polyaromatic moieties, wherein said polyaromatic moieties are selected from the group of $C_{10}$-$C_{100}$ polyaromatic moieties, at least some of said polyaromatic moieties being reacted with an acid, said dispersion:
   being free of surfactants;
   having a carbon nanotube concentration of at least about 0.05% by weight, based upon the total weight of the dispersion taken as 100% by weight; and
   being formable into a film having a sheet resistance of less than about 7,000 Ω/sq.

2. The dispersion of claim 1, wherein said carbon nanotubes are selected from the group consisting of single-walled, double-walled, and multi-walled carbon nanotubes.

3. The dispersion of claim 1, wherein said acid has a pKa of less than about −1.

4. The dispersion of claim 1, wherein said acid is selected from the group consisting of sulfuric acid, chlorosulfonic acid, triflic acid, p-toluenesulfonic acid, and mixtures thereof.

5. The dispersion of claim 1, wherein said carbon nanotubes and compounds comprising at least one polyaromatic moiety are provided in quantities such that the molar ratio of carbon nanotubes to polyaromatic moieties is from about 25:75 to about 75:25.

6. The dispersion of claim 1, wherein the carbon nanotube concentration in the dispersion is at least about 0.10% by weight, based upon the total weight of the dispersion taken as 100% by weight.

7. The dispersion of claim 1, wherein the dispersion can be formed into a film having a sheet resistance of less than about 2,000 Ω/sq.

8. The dispersion of claim 1, wherein said polyaromatic moieties are planar or have a large planar area.

9. The dispersion of claim 1, wherein said film has a sheet resistance of less than about 7,000 Ω/sq at 85% T.

10. A dispersion prepared by:
    providing a mixture of carbon nanotubes, a compound comprising at least one polyaromatic moiety, and an acid;
    noncovalently bonding said carbon nanotubes with said compound comprising at least one polyaromatic moiety; and
    reacting said acid with said at least one polyaromatic moiety, wherein said polyaromatic moiety is selected from the group of $C_{10}$-$C_{100}$ polyaromatic moieties,
    wherein said dispersion is free of surfactants has a carbon nanotube concentration of at least about 0.05% by weight, based upon the total weight of the dispersion taken as 100% by weight; and
    is formable into a film having a sheet resistance of less than about 7,000 Ω/sq.

11. The dispersion of claim 10, wherein said carbon nanotubes are selected from the group consisting of single-walled, double-walled, and multi-walled carbon nanotubes.

12. The dispersion of claim 10, wherein said acid has a pKa of less than about −1.

13. The dispersion of claim 10, wherein said acid is selected from the group consisting of sulfuric acid, chlorosulfonic acid, triflic acid, p-toluenesulfonic acid, and mixtures thereof.

14. The dispersion of claim 10, wherein said carbon nanotubes and compounds comprising at least one polyaromatic moiety are provided in quantities such that the molar ratio of carbon nanotubes to polyaromatic moieties is from about 25:75 to about 75:25.

15. The dispersion of claim 10, wherein said polyaromatic moieties are planar or have a large planar area.

16. The dispersion of claim 10, wherein said film has a sheet resistance of less than about 7,000 Ω/sq at 85% T.

17. A dispersion comprising carbon nanotubes noncovalently bonded to compounds comprising respective polyaromatic moieties, at least some of said polyaromatic moieties being reacted with an acid, said dispersion:
    being free of surfactants;
    having a carbon nanotube concentration of at least about 0.05% by weight, based upon the total weight of the dispersion taken as 100% by weight; and
    being formable into a film having a sheet resistance of less than about 7,000 Ω/sq, wherein said compound comprising at least one aromatic moiety is selected from the group consisting of substituted and unsubstituted compounds selected from the group consisting of naphthalene, pyrene, chrysene, triphenylene, pentaphene, perylene, benzo[a]pyrene, coronene, anthanthrene, corannulene, ovalene, graphene, fullerene, cycloparaphenylene, polyparaphenylene, cyclophene, and compounds containing moieties of the foregoing.

* * * * *